United States Patent [19]

Asada et al.

[11] Patent Number: 5,099,718
[45] Date of Patent: Mar. 31, 1992

[54] AUTOMATIC TRANSMISSION AND SPEED CHANGE CONTROL METHOD

[75] Inventors: Toshiyuki Asada, Toyota; Hideo Tomomatsu; Yasuo Hojo, both of Nagoya, all of Japan

[73] Assignee: Toyota Jidosha Kabushiki Kaisha, Toyota, Japan

[21] Appl. No.: 603,157

[22] Filed: Oct. 25, 1990

[30] Foreign Application Priority Data

| Oct. 27, 1989 | [JP] | Japan | 1-280952 |
| Oct. 27, 1989 | [JP] | Japan | 1-280953 |
| Dec. 8, 1989 | [JP] | Japan | 1-319334 |
| Dec. 8, 1989 | [JP] | Japan | 1-319335 |
| Jan. 16, 1990 | [JP] | Japan | 2-6857 |

[51] Int. Cl.⁵ .................................................. B60K 41/04
[52] U.S. Cl. ................................... 74/866; 475/276; 475/281
[58] Field of Search ..................... 74/866; 475/276, 281

[56] References Cited

U.S. PATENT DOCUMENTS

| 3,282,131 | 11/1966 | Smith | 475/276 |
| 3,951,010 | 4/1976 | Polak | 475/276 |
| 4,038,887 | 8/1977 | Murakami et al. | 475/276 |
| 4,233,861 | 11/1980 | Gaus et al. | 475/56 |
| 4,446,758 | 5/1984 | Winzeler et al. | 475/276 X |
| 4,660,439 | 4/1987 | Hiraiwa | 475/276 |
| 4,733,580 | 3/1988 | Kubo et al. | 74/866 |
| 4,742,733 | 5/1988 | Schreiner | 74/866 |
| 4,791,568 | 12/1988 | Hiramatsu et al. | 74/866 X |
| 4,823,266 | 4/1989 | Baltusis et al. | 74/866 X |
| 4,928,557 | 5/1990 | Takada et al. | 74/866 X |
| 4,945,482 | 7/1990 | Nishikawa et al. | 74/866 X |
| 4,963,124 | 10/1990 | Takahashi et al. | 475/276 X |

FOREIGN PATENT DOCUMENTS 3935570 10/1989 Fed. Rep. of Germany .

Primary Examiner—Leslie A. Braun
Assistant Examiner—Matthew Stavish
Attorney, Agent, or Firm—Oblon, Spivak, McClelland, Maier & Neustadt

[57] ABSTRACT

An automatic transmission includes a plurality of frictional engagement means and a gear train including a plurality of rotary members and adapted to be set to a plurality of speeds of different gear ratios in accordance with the engagement/disengagement statuses of the frictional engagement means. The gear train has a plurality of kinds of combination patterns of engagement/disengagement of the frictional engagement means for setting a predetermined speed and the number of revolutions of any of its rotary members can vary according to which of the engagement/disengagement patterns is selected. Speed control means is provided for selecting one of the combination patterns of the frictional engagement means for setting the predetermined speed so as to decrease the fluctuating number of revolutions of the rotary members.

48 Claims, 29 Drawing Sheets

FIG. 2

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ① | ○ | | | ○ | ○ | ○ | * | | |
| | | ② | ○ | | | ○ | ○ | * | ○ | | |
| | | ③ | ○ | | | ○ | * | ○ | ○ | | |
| 2nd | a | ① | ○ | ○ | | | ○ | ○ | * | | * |
| | | ② | ○ | ○ | | | ○ | * | ○ | | * |
| | | ③ | ○ | ○ | | | ○ | * | * | | ○ |
| | | ④ | ○ | ○ | | | * | ○ | ○ | | * |
| | | ⑤ | ○ | * | | | * | ○ | * | | ○ |
| | | ⑥ | ○ | * | | | ○ | * | ○ | | ○ |
| | b | ① | ○ | | | ○ | | ○ | | ○ | * |
| | | ② | ○ | | | * | | ○ | | * | ○ |
| 2.2th | | | ○ | ○ | | | | ○ | | ○ | |
| 2.5th | | ① | ○ | | | ○ | ○ | | | ○ | * |
| | | ② | ○ | | | ○ | ○ | | | * | ○ |
| | | ③ | ○ | | | * | ○ | | | ○ | ○ |
| 2.7th | | | ○ | ○ | | ○ | | ○ | | | |
| 3rd | a | ① | ○ | | ○ | | * | ○ | * | | |
| | | ② | ○ | | ○ | | ○ | * | ○ | | |
| | b | | ○ | | ○ | | | ○ | | * | |
| | c | | ○ | | ○ | * | | ○ | | | |
| | d | | ○ | * | ○ | | | ○ | | | |
| 3.2th | | | ○ | ○ | | | ○ | | | ○ | |
| 3.5th | | | ○ | | ○ | | ○ | | | ○ | |
| 4th | a | ① | * | ○ | ○ | ○ | * | | | | |
| | | ② | ○ | ○ | ○ | * | ○ | | | | |
| | | ③ | ○ | ○ | * | ○ | ○ | | | | |
| | | ④ | ○ | * | ○ | ○ | ○ | | | | |
| | b | | | ○ | ○ | ○ | | * | | | |
| 5th | a | | | ○ | ○ | | * | | | ○ | |
| | b | | * | ○ | ○ | | | | | ○ | |
| | c | | | ○ | ○ | | | * | | ○ | |
| Rev | a | ① | | | ○ | ○ | * | * | ○ | | |
| | | ② | | | ○ | ○ | ○ | ○ | * | | |
| | b | | * | | ○ | ○ | | | ○ | | |

FIG. 3

| | | | 1st planetary gear set | | | 2nd planetary gear set | | | 3rd planetary gear set | | |
|---|---|---|---|---|---|---|---|---|---|---|---|
| | | | 1S | 1C | 1R | 2S | 2C | 2R | 3S | 3C | 3R |
| 1st | | ①②③ | -0.78 | 0.45 | 1.00 | -0.78 | 0.00 | 0.32 | 0.00 | 0.32 | 0.45 |
| 2nd | a | ①②③④⑤⑥ | 0.00 | 0.69 | 1.00 | -1.21 | 0.00 | 0.49 | 0.00 | 0.49 | 0.69 |
| | b | ①② | | | | 0.00 | 0.35 | | | | |
| 2.2th | | | 0.41 | 0.82 | 1.00 | 0.00 | 0.41 | 0.58 | 0.00 | 0.58 | 0.82 |
| 2.5th | | ①②③ | 0.00 | 0.69 | 1.00 | 0.00 | 0.44 | 0.62 | 0.44 | 0.62 | 0.69 |
| 2.7th | | | 0.63 | 0.89 | 1.00 | 0.63 | 0.63 | 0.63 | 0.00 | 0.63 | 0.89 |
| 3rd | a | ①② | 1.00 | 1.00 | 1.00 | -1.76 | 0.00 | 0.71 | 0.00 | 0.71 | 1.00 |
| | b | | | | | 0.00 | 0.51 | | | | |
| | c | | | | | 1.00 | 0.79 | | | | |
| | d | | | | | 1.71 | 1.00 | | | | |
| 3.2th | | | 0.54 | 0.86 | 1.00 | 0.00 | 0.54 | 0.77 | 0.54 | 0.77 | 0.86 |
| 3.5th | | | 1.00 | 1.00 | 1.00 | 0.00 | 0.64 | 0.90 | 0.64 | 0.90 | 1.00 |
| 4th | a | ①②③④ | 1.00 | 1.00 | 1.00 | 1.00 | 1.00 | 1.00 | 1.00 | 1.00 | 1.00 |
| | b | | | 1.41 | 1.59 | | | | 0.00 | | 1.41 |
| 5th | a | | | 1.57 | 1.83 | | | | 1.00 | | 1.57 |
| | b | | 1.00 | 1.00 | 1.00 | 0.00 | 1.00 | 1.41 | 2.40 | 1.41 | 1.00 |
| | c | | | 1.97 | 2.41 | | | | 0.00 | | 1.97 |
| Rev | a | ①② | 1.00 | -0.57 | -1.28 | 1.00 | 0.00 | -0.41 | 0.00 | -0.41 | -0.57 |
| | b | | | 1.00 | 1.00 | | | | -3.87 | | 1.00 |

FIG. 4

| | Clutch Means | | | | | Brake Means | | | |
|---|---|---|---|---|---|---|---|---|---|
| | K1 | K2 | K3 | K4 | K5 | B1 | B2 | B3 | B4 |
| 1st    ③ | O | | | O | * | O | O | | |
| 2nd  b  ① | O | | | O | | O | | O | * |
| 3rd  c | O | | O | * | | O | | | |
| 4th  a  ① | * | O | O | O | * | | | | |
| 5th  a | | O | O | | * | | | O | |

FIG. 5

| | Clutch Means | | | | | Brake Means | | | |
|---|---|---|---|---|---|---|---|---|---|
| | K1 | K2 | K3 | K4 | K5 | B1 | B2 | B3 | B4 |
| 1st    ③ | O | | | O | * | O | O | | |
| 2nd  b  ① | O | | | O | | O | | O | * |
| 3rd  c | O | | O | * | | O | | | |
| 4th  b | | O | O | O | | * | | | |
| 5th  a | | O | O | | * | | | O | |

FIG. 6

| | Clutch Means | | | | | Brake Means | | | |
|---|---|---|---|---|---|---|---|---|---|
| | K1 | K2 | K3 | K4 | K5 | B1 | B2 | B3 | B4 |
| 1st    ③ | O | | | O | * | O | O | | |
| 2nd  b  ① | O | | | O | | O | | O | * |
| 3rd  c | O | | O | * | | O | | | |
| 4th  b | | O | O | O | | * | | | |
| 5th  c | | O | O | | | * | | O | |

FIG.9

|   | K1 | K2 | K3 | K4 | K5 | B1 | B2 | B3 | B4 |
|---|---|---|---|---|---|---|---|---|---|
| 1-2 |  |  |  | 1-2a | 1-2b |  | 1-2b |  |  |
| 2-3 |  | 2a-3a |  | 2b-3b | 2a-3d |  | 2a-3d | 2b-3c | 2-3 |
| 3-4 | 3c-4b<br>3d-4b |  |  |  |  | 3a-4a<br>3c-4a<br>3d-4a | 3a-4a |  |  |
| 4-5 | 4a-5a |  |  | 4-5 | 4a-5b |  |  |  |  |

FIG.10

|  |  |  | Clutch Means |  |  |  |  | Brake Means |  |  |  |
|---|---|---|---|---|---|---|---|---|---|---|---|
|  |  |  | K1 | K2 | K3 | K4 | K5 | B1 | B2 | B3 | B4 |
| 1st |  | ① | O |  |  | O | O | O | ◎ |  |  |
|  |  | ① | O |  |  | O | ● | O | △ |  |  |
| 2nd | b | ① | O |  |  | ● |  | O |  | O | △ |
| 3rd | b |  | O |  | O |  |  | O |  | ◎ |  |
|  | c |  | O |  | O | ◎ |  | ● |  |  |  |
| 4th | a | ① | ◎ | O | O | O | △ |  |  |  |  |
|  | a |  | ◎ | O | O | O | ◎ |  |  |  |  |
|  | a | ② | ● | O | O | △ | O |  |  |  |  |
| 5th | a |  |  | O | O |  | ◎ |  |  | O |  |

FIG.11

|  |  |  | Clutch Means |  |  |  |  | Brake Means |  |  |  |
|---|---|---|---|---|---|---|---|---|---|---|---|
|  |  |  | K1 | K2 | K3 | K4 | K5 | B1 | B2 | B3 | B4 |
| 1st |  | ① | O |  |  | O | O | O | ◎ |  |  |
|  |  | ① | O |  |  | O | ● | O | △ |  |  |
| 2nd | b | ① | O |  |  | ● |  | O |  | O | △ |
| 3rd | b |  | O |  | O |  |  | O |  | ◎ |  |
|  | c |  | O |  | O | ◎ |  | ● |  |  |  |
| 4th | a | ④ | O | △ | O | O | △ |  |  |  |  |
|  | a |  | O | ◎ | O | O | O |  |  |  |  |
|  | a | ② | ● | O | O | △ | O |  |  |  |  |
| 5th | a |  |  | O | O |  | ◎ |  |  | O |  |

FIG.12

|  |  |  | Clutch Means |  |  |  |  | Brake Means |  |  |  |
|---|---|---|---|---|---|---|---|---|---|---|---|
|  |  |  | K1 | K2 | K3 | K4 | K5 | B1 | B2 | B3 | B4 |
| 1st |  | ① | O |  |  | O | O | O | ◎ |  |  |
|  |  | ① | O |  |  | O | ● | O | △ |  |  |
| 2nd | b | ① | O |  |  | ● |  | O |  | O | △ |
| 3rd | b |  | O |  | O |  |  | O |  | ◎ |  |
|  | c |  | O |  | O | ◎ |  | ● |  |  |  |
| 4th | a | ① | ◎ | O | O | O | △ |  |  |  |  |
|  | a | ① | △ | O | O | ● | ◎ |  |  |  |  |
| 5th | a |  |  | O | O |  | ◎ |  |  | O |  |

FIG. 13

|  |  |  | Clutch Means | | | | | Brake Means | | | |
|---|---|---|---|---|---|---|---|---|---|---|---|
|  |  |  | K1 | K2 | K3 | K4 | K5 | B1 | B2 | B3 | B4 |
| 1st |  | ① | ○ |  |  | ○ | ○ | ○ | ◎ |  |  |
|  |  | ① | ○ |  |  | ○ | ● | ○ | △ |  |  |
| 2nd | b | ① | ○ |  |  | ● |  | ○ |  | ○ | △ |
| 3rd | b |  | ○ |  | ○ |  |  | ○ |  | ◎ |  |
|  | c |  | ○ |  | ○ | ◎ |  | ● |  |  |  |
| 4th | a | ④ | ○ | △ | ○ | ○ | ○ |  |  |  |  |
|  | a |  | ○ | ◎ | ○ | ○ | ○ |  |  |  |  |
|  | a | ① | △ | ○ | ○ | ● | ○ |  |  |  |  |
| 5th | a |  |  | ○ | ○ |  | ◎ |  |  | ○ |  |

FIG. 14

|  |  |  | Clutch Means | | | | | Brake Means | | | |
|---|---|---|---|---|---|---|---|---|---|---|---|
|  |  |  | K1 | K2 | K3 | K4 | K5 | B1 | B2 | B3 | B4 |
| 1st |  | ① | ○ |  |  | ○ | ○ | ○ | ◎ |  |  |
|  |  | ① | ○ |  |  | ○ | ● | ○ | △ |  |  |
| 2nd | b | ① | ○ |  |  | ◎ |  | ○ |  | ○ | △ |
| 3rd | b |  | ○ |  | ○ |  |  | ○ |  | ◎ |  |
|  | c |  | ○ |  | ○ | ◎ |  | ● |  |  |  |
| 4th | a | ① | ◎ | ○ | ○ | ○ | △ |  |  |  |  |
|  | a |  | ◎ | ○ | ○ | ○ | ◎ |  |  |  |  |
|  | a | ② | ● | ○ | ○ | △ | ○ |  |  |  |  |
| 5th | a |  |  | ○ | ○ |  | ◎ |  |  | ○ |  |

FIG. 15

|  |  |  | Clutch Means | | | | | Brake Means | | | |
|---|---|---|---|---|---|---|---|---|---|---|---|
|  |  |  | K1 | K2 | K3 | K4 | K5 | B1 | B2 | B3 | B4 |
| 1st |  | ① | ○ |  |  | ○ | ○ | ○ | ◎ |  |  |
|  |  | ① | ○ |  |  | ○ | ● | ○ | △ |  |  |
| 2nd | b | ① | ○ |  |  | ◎ |  | ○ |  | ○ | △ |
| 3rd | b |  | ○ |  | ○ |  |  | ○ |  | ◎ |  |
|  | c |  | ○ |  | ○ | ◎ |  | ● |  |  |  |
| 4th | a | ④ | ○ | △ | ○ | ○ | ○ |  |  |  |  |
|  | a |  | ○ | ◎ | ○ | ○ | ○ |  |  |  |  |
|  | a | ② | ● | ○ | ○ | △ | ○ |  |  |  |  |
| 5th | a |  |  | ○ | ○ |  | ◎ |  |  | ○ |  |

FIG.16

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ① | ○ | | | ○ | ○ | ○ | ◎ | | |
| | | ① | ○ | | | ○ | ● | ○ | △ | | |
| 2nd | b | ② | ○ | | | ◎ | | ○ | | ○ | ● |
| 3rd | b | | ○ | | ○ | | | ○ | | ◎ | |
| | c | | ○ | | | ○ | ◎ | ● | | | |
| 4th | a | ① | ◎ | ○ | ○ | ○ | △ | | | | |
| | a | ① | △ | ○ | ○ | ● | ◎ | | | | |
| 5th | a | | | ○ | ○ | | ◎ | | | ○ | |

FIG.17

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ① | ○ | | | ○ | ○ | ○ | ◎ | | |
| | | ① | ○ | | | ○ | ● | ○ | △ | | |
| 2nd | b | ② | ○ | | | ◎ | | ○ | | ○ | ● |
| 3rd | b | | ○ | | ○ | | | ○ | | ◎ | |
| | c | | ○ | | | ○ | ◎ | ● | | | |
| 4th | a | ④ | ○ | △ | ○ | ○ | ○ | | | | |
| | a | | ○ | ◎ | ○ | ○ | ○ | | | | |
| | a | ① | △ | ○ | ○ | ● | ◎ | | | | |
| 5th | a | | | ○ | ○ | | ◎ | | | ○ | |

FIG.18

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ③ | ○ | | | ○ | △ | ○ | ● | | |
| 2nd | b | ① | ○ | | | ● | | ○ | | ○ | △ |
| 3rd | b | | ○ | | ○ | | | ○ | | ◎ | |
| | c | | ○ | | | ○ | ◎ | ● | | | |
| 4th | a | ① | ◎ | ○ | ○ | ○ | △ | | | | |
| | a | | ◎ | ○ | ○ | ○ | ◎ | | | | |
| | a | ② | ● | ○ | ○ | △ | ○ | | | | |
| 5th | a | | | ○ | ○ | | ◎ | | | ○ | |

FIG. 19

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ③ | ○ | | | ○ | △ | ○ | ● | | |
| 2nd | b | ① | ○ | | | ● | | ○ | | ○ | △ |
| 3rd | b | | ○ | | ○ | | | ○ | | ◎ | |
| | c | | ○ | | | ○ | ◎ | ● | | | |
| 4th | a | ① | ◎ | △ | ○ | ○ | ○ | | | | |
| | a | | ○ | ◎ | ○ | ○ | ○ | | | | |
| | a | ② | ● | ○ | ○ | △ | ○ | | | | |
| 5th | a | | | ○ | ○ | | ◎ | | | ○ | |

FIG. 20

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ③ | ○ | | | ○ | △ | ○ | ● | | |
| 2nd | b | ① | ○ | | | ● | | ○ | | ○ | △ |
| 3rd | b | | ○ | | ○ | | | ○ | | ◎ | |
| | c | | ○ | | | ○ | ◎ | ● | | | |
| 4th | a | ① | ◎ | ○ | ○ | ○ | △ | | | | |
| | a | ① | △ | ○ | ○ | ● | ◎ | | | | |
| 5th | a | | | ○ | ○ | | ◎ | | | ○ | |

FIG. 21

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ③ | ○ | | | ○ | △ | ○ | ● | | |
| 2nd | b | ① | ○ | | | ● | | ○ | | ○ | △ |
| 3rd | b | | ○ | | ○ | | | ○ | | ◎ | |
| | c | | ○ | | | ○ | ◎ | ● | | | |
| 4th | a | ④ | ○ | △ | ○ | ○ | ○ | | | | |
| | a | | ○ | ◎ | ○ | ○ | ○ | | | | |
| | a | ① | △ | ○ | ○ | ● | ◎ | | | | |
| 5th | a | | | ○ | ○ | | ◎ | | | ○ | |

FIG. 22

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ③ | ○ | | | ○ | △ | ○ | ● | | |
| 2nd | b | ② | ○ | | | ◎ | | ○ | | ○ | ● |
| 3rd | b | | ○ | | ○ | | | ○ | | ◎ | |
| | c | | ○ | | | ○ | ◎ | ● | | | |
| 4th | a | ① | ◎ | ○ | ○ | ○ | △ | | | | |
| | a | | ◎ | ○ | ○ | ○ | ◎ | | | | |
| | a | ② | ● | ○ | ○ | △ | ○ | | | | |
| 5th | a | | | ○ | ○ | | ◎ | | | ○ | |

FIG. 23

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ③ | ○ | | | ○ | △ | ○ | ● | | |
| 2nd | b | ② | ○ | | | ◎ | | ○ | | ○ | ● |
| 3rd | b | | ○ | | ○ | | | ○ | | ◎ | |
| | c | | ○ | | | ○ | ◎ | ● | | | |
| 4th | a | ④ | ○ | △ | ○ | ○ | ○ | | | | |
| | a | | ○ | ◎ | ○ | ○ | ○ | | | | |
| | a | ② | ● | ○ | ○ | △ | ○ | | | | |
| 5th | a | | | ○ | ○ | | ◎ | | | ○ | |

FIG. 24

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ③ | ○ | | | ○ | △ | ○ | ● | | |
| 2nd | b | ② | ○ | | | ◎ | | ○ | | ○ | ● |
| 3rd | b | | ○ | | ○ | | | ○ | | ◎ | |
| | c | | ○ | | | ○ | ◎ | ● | | | |
| 4th | a | ① | ◎ | ○ | ○ | ○ | △ | | | | |
| | a | ① | △ | ○ | ○ | ● | ◎ | | | | |
| 5th | a | | | ○ | ○ | | ◎ | | | ○ | |

FIG. 25

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ③ | O | | | O | △ | O | ● | | |
| 2nd | b | ② | O | | | ◎ | | O | | O | ● |
| 3rd | b | | O | | O | | | O | | ◎ | |
| | c | | O | | | O | ◎ | ● | | | |
| 4th | a | ① | O | △ | O | O | O | | | | |
| | a | | O | ◎ | O | O | O | | | | |
| | a | ② | △ | O | O | ● | O | | | | |
| 5th | a | | | O | O | | ◎ | | | O | |

FIG. 26

| | | Clutch Means | | | K4 | | K5 | Brake Means | | B2 | B3 | B4 |
|---|---|---|---|---|---|---|---|---|---|---|---|---|
| | | K1 | K2 | K3 | 22 | 20 | | 42 | 40 | | | |
| 1st | | O | | | ※ | O | | O | O | O | | |
| 2nd | a | O | | | | | | ※ | O | O | | O |
| | b | O | | | O | | | ※ | O | | O | O |
| | | O | | | ※ | O | | O | O | | O | |
| 3rd | b | O | | O | | | | ※ | O | | O | |
| | c | O | | O | O | | | ※ | O | | | |
| 4th | a | O | | O | O | | O | | | | | |
| | | O | O | O | O | | O | | | | | |
| | | | O | O | ※ | O | O | | | | | |
| 5th | a | | O | O | | | O | | | | O | |

FIG. 32
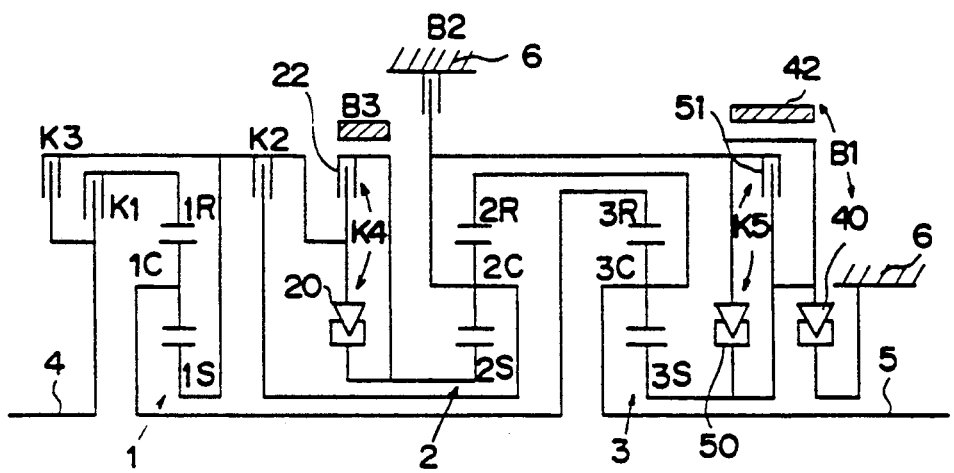
FIG. 33
| | | Clutch Means | | | | | | Brake Means | | | |
|---|---|---|---|---|---|---|---|---|---|---|---|
| | | K1 | K2 | K3 | K4 | | K5 | | B1 | | B2 | B3 |
| | | | | | 22 | 20 | 51 | 50 | 42 | 40 | | |
| 1st | | ○ | | | ○ | ○ | | ○ | ※ | ○ | ○ | |
| | | ○ | | | ○ | ○ | ※ | ○ | ○ | ○ | | |
| 2nd | b | ○ | | | ※ | ○ | | | ○ | ○ | | ○ |
| 3rd | b | ○ | | ○ | | | | | ※ | ○ | | ○ |
| | c | ○ | | ○ | ○ | | | | ※ | ○ | | |
| 4th | a | ○ | ○ | ○ | ○ | | | | | | | |
| | | | ○ | ○ | ※ | ○ | ○ | | | | | |
| 5th | a | | ○ | ○ | | | | ○ | | | | ○ |
FIG. 34
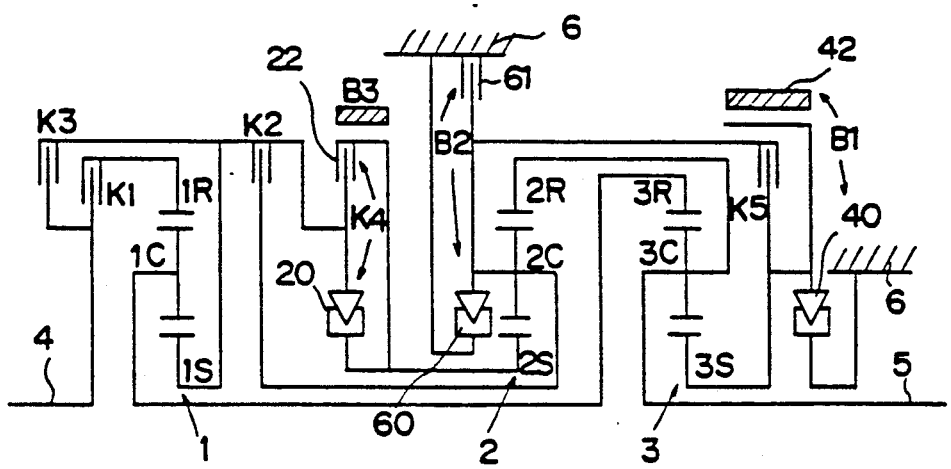

| | Clutch Means | | | | | | Brake Means | | | | |
|---|---|---|---|---|---|---|---|---|---|---|---|
| | K1 | K2 | K3 | K4 | | K5 | B1 | | B2 | | B3 |
| | | | | 22 | 20 | | 42 | 40 | 61 | 60 | |
| 1st | ○ | | | ○ | ○ | | ○ | ○ | ※ | ○ | |
| 2nd b | ○ | | | ※ | ○ | | ○ | ○ | | | ○ |
| 3rd b | ○ | | ○ | | | | ※ | ○ | | | ○ |
| c | ○ | | | ○ | ○ | | ※ | ○ | | | |
| 4th a | ○ | ○ | ○ | ○ | | | | | | | |
| | | ○ | ○ | ※ | ○ | ○ | | | | | |
| 5th a | | ○ | ○ | | | ○ | | | | | ○ |

|  |  |  | Clutch Means | | | | | Brake Means | | | |
|---|---|---|---|---|---|---|---|---|---|---|---|
|  |  |  | K1 | K2 | K3 | K4 | K5 | B1 | B2 | B3 | B4 |
| 1st |   | ① | ○ |  |  | ○ | ○ | ○ | ◎ |  |  |
|     |   | ① | ○ |  |  | ○ | ● | ○ | △ |  |  |
| 2nd | b | ① | ○ |  |  | ● |  | ○ |  | ○ | △ |
| 3rd | b |   | ○ |  | ○ |  |  | ○ |  | ◎ |  |
|     | c | ① | ○ | ◎ | ○ | △ |  | ● |  |  |  |
| 4th |   | ① | ● | ○ | ○ | △ | ○ |  |  |  |  |
| 5th |   |   |  | ○ | ○ |  | ○ |  |  | ○ |  |

FIG.42

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ① | ○ | | | ○ | ○ | ○ | * | | |
| | | ② | ○ | | | ○ | ○ | * | ○ | | |
| | | ③ | ○ | | | ○ | * | ○ | ○ | | |
| 2nd | a | ① | ○ | ○ | | | ○ | ○ | * | | * |
| | | ② | ○ | ○ | | | ○ | * | ○ | | * |
| | | ③ | ○ | ○ | | | ○ | * | * | | ○ |
| | | ④ | ○ | ○ | | | * | ○ | ○ | | * |
| | | ⑤ | ○ | * | | | * | ○ | * | | ○ |
| | | ⑥ | ○ | * | | | ○ | * | ○ | | ○ |
| | b | ① | ○ | | | ○ | | ○ | | ○ | * |
| | | ② | ○ | | | * | | ○ | | * | ○ |
| 2.2th | | | ○ | ○ | | | | ○ | | ○ | |
| 2.5th | | ① | ○ | | | ○ | ○ | | | ○ | * |
| | | ② | ○ | | | ○ | ○ | | | * | ○ |
| | | ③ | ○ | | | * | ○ | | | ○ | ○ |
| 3rd | a | ① | ○ | | ○ | | * | ○ | * | | |
| | | ② | ○ | | ○ | | ○ | * | ○ | | |
| | b | | ○ | | ○ | | | ○ | | * | |
| | c | ① | ○ | * | ○ | * | | ○ | | | |
| | | ② | ○ | ○ | * | ○ | | ○ | | | |
| | | ③ | * | ○ | ○ | ○ | | ○ | | | |
| 3.2th | | | ○ | ○ | | | ○ | | | ○ | |
| 3.5th | | | ○ | | ○ | | ○ | | | ○ | |
| 4th | | ① | ○ | ○ | ○ | * | ○ | | | | |
| | | ② | ○ | ○ | * | ○ | ○ | | | | |
| | | ③ | ○ | * | ○ | ○ | ○ | | | | |
| | | ④ | * | ○ | ○ | ○ | ○ | | | | |
| 4.5th | | | | ○ | ○ | | | ○ | | ○ | |
| 5th | | | | ○ | ○ | | ○ | | | ○ | |
| Rev | | ① | | | ○ | ○ | ○ | ○ | * | | |
| | | ② | | | ○ | ○ | ○ | * | ○ | | |
| | | ③ | | | ○ | ○ | * | ○ | ○ | | |

FIG.43

| | | | 1st planetary gear set | | | 2nd planetary gear set | | | 3rd planetary gear set | | |
|---|---|---|---|---|---|---|---|---|---|---|---|
| | | | 1S | 1C | 1R | 2S | 2C | 2R | 3S | 3C | 3R |
| 1st | | ①②③ | -0.78 | 0.45 | 1.00 | -0.78 | 0.00 | 0.45 | 0.00 | 0.32 | 0.45 |
| 2nd | a | ①②③④⑤⑥ | 0.00 | 0.69 | 1.00 | -1.21 | 0.00 | 0.69 | 0.00 | 0.49 | 0.69 |
| | b | ①② | | | | 0.00 | 0.44 | | | | |
| 2.2th | | | 0.54 | 0.86 | 1.00 | 0.00 | 0.45 | 0.86 | 0.00 | 0.61 | 0.86 |
| 2.5th | | ①②③ | 0.00 | 0.69 | 1.00 | 0.00 | 0.44 | 0.69 | 0.44 | 0.62 | 0.69 |
| 3rd | a | ①② | | | | -1.76 | 0.00 | | | | |
| | b | | 1.00 | 1.00 | 1.00 | 0.00 | 0.51 | 1.00 | 0.00 | 0.71 | 1.00 |
| | c | ①②③ | | | | 1.00 | 1.00 | | | | |
| 3.2th | | | 0.54 | 0.86 | 1.00 | 0.00 | 0.54 | 0.86 | 0.54 | 0.77 | 0.86 |
| 3.5th | | | 1.00 | 1.00 | 1.00 | 0.00 | 0.64 | 1.00 | 0.64 | 0.90 | 1.00 |
| 4th | | ①②③④ | 1.00 | 1.00 | 1.00 | 1.00 | 1.00 | 1.00 | 1.00 | 1.00 | 1.00 |
| 4.5th | | | 1.00 | 1.57 | 1.83 | 0.00 | 1.00 | 1.57 | 0.00 | 1.12 | 1.57 |
| 5th | | | 1.00 | 1.57 | 1.83 | 0.00 | 1.00 | 1.57 | 1.00 | 1.41 | 1.57 |
| Rev | | ①②③ | 1.00 | -0.57 | -1.28 | 1.00 | 0.00 | -0.57 | 0.00 | -0.41 | -0.57 |

FIG. 45

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ① | O | | | O | O | O | ◎ | | |
| | | ① | O | | | O | ● | O | △ | | |
| 2nd | b | ① | O | | | ● | | O | | O | △ |
| 3rd | b | | O | | O | | | O | | ◎ | |
| | c | ① | O | △ | O | ◎ | | ● | | | |
| 4th | | ③ | O | ◎ | O | O | O | | | | |
| | | ① | ● | O | O | △ | O | | | | |
| 5th | | | | O | O | | O | | | O | |

FIG. 46

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ① | O | | | O | O | O | ◎ | | |
| | | ① | O | | | O | ● | O | △ | | |
| 2nd | b | ① | O | | | ● | | O | | O | △ |
| 3rd | b | | O | | O | | | O | | ◎ | |
| | c | ① | O | ◎ | O | △ | | ● | | | |
| 4th | | ① | O | O | O | ◎ | O | | | | |
| | | ④ | △ | O | O | ● | O | | | | |
| 5th | | | | O | O | | O | | | O | |

FIG. 47

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ① | O | | | O | O | O | ◎ | | |
| | | ① | O | | | O | ● | O | △ | | |
| 2nd | b | ① | O | | | ● | | O | | O | △ |
| 3rd | b | | O | | O | | | O | | ◎ | |
| | c | ① | O | △ | O | ◎ | | ● | | | |
| 4th | | ③ | O | ◎ | O | O | O | | | | |
| | | ④ | △ | O | O | ● | O | | | | |
| 5th | | | | O | O | | O | | | O | |

FIG. 48

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ① | ○ | | | ○ | ○ | ○ | ◎ | | |
| | | ① | ○ | | | ○ | ● | ○ | △ | | |
| 2nd | b | ① | ○ | | | ◎ | | ○ | | △ | ○ |
| | | ② | ○ | | | △ | | ○ | | ◎ | ● |
| 3rd | b | | ○ | | ○ | | | ○ | | ◎ | |
| | c | ① | ○ | ◎ | ○ | △ | | ● | | | |
| 4th | | ① | ● | ○ | ○ | △ | ○ | | | | |
| 5th | | | | ○ | ○ | | ○ | | | ○ | |

FIG. 49

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ① | ○ | | | ○ | ○ | ○ | ◎ | | |
| | | ① | ○ | | | ○ | ● | ○ | △ | | |
| 2nd | b | ① | ○ | | | ◎ | | ○ | | △ | ○ |
| | | ② | ○ | | | △ | | ○ | | ◎ | ● |
| 3rd | b | | ○ | | ○ | | | ○ | | ◎ | |
| | c | ① | ○ | △ | ○ | ◎ | | ● | | | |
| 4th | | ③ | ○ | ◎ | ○ | ○ | ○ | | | | |
| | | ① | ● | ○ | ○ | △ | ○ | | | | |
| 5th | | | | ○ | ○ | | ○ | | | ○ | |

FIG. 50

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ① | ○ | | | ○ | ○ | ○ | ◎ | | |
| | | ① | ○ | | | ○ | ● | ○ | △ | | |
| 2nd | b | ① | ○ | | | ◎ | | ○ | | △ | ○ |
| | | ② | ○ | | | △ | | ○ | | ◎ | ● |
| 3rd | b | | ○ | | ○ | | | ○ | | ◎ | |
| | c | ① | ○ | ◎ | ○ | △ | | ● | | | |
| 4th | | ① | ○ | ○ | ○ | ◎ | ○ | | | | |
| | | ④ | △ | ○ | ○ | ● | ○ | | | | |
| 5th | | | | ○ | ○ | | ○ | | | ○ | |

FIG. 51

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ① | ○ | | | ○ | ○ | ○ | ◎ | | |
| | | ① | ○ | | | ○ | ● | ○ | △ | | |
| 2nd | b | ② | ○ | | | ◎ | | ○ | | △ | ○ |
| | | ② | ○ | | | △ | | ○ | | ◎ | ● |
| 3rd | b | | ○ | | ○ | | | ○ | | ◎ | |
| | c | ① | ○ | △ | ○ | ◎ | | ● | | | |
| 4th | | ① | ● | ○ | ○ | △ | ○ | | | | |
| | | ④ | △ | ○ | ○ | ● | ○ | | | | |
| 5th | | | | ○ | ○ | | ○ | | | ○ | |

FIG. 52

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ② | ○ | | | ○ | △ | ○ | ● | | |
| 2nd | b | ① | ○ | | | ● | | ○ | | ○ | △ |
| 3rd | b | | ○ | | ○ | | | ○ | | ◎ | |
| | c | ① | ○ | ◎ | ○ | △ | | ● | | | |
| 4th | | ① | ● | ○ | ○ | △ | ○ | | | | |
| 5th | | | | ○ | ○ | | ○ | | | ○ | |

FIG. 53

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ② | ○ | | | ○ | △ | ○ | ● | | |
| 2nd | b | ① | ○ | | | ● | | ○ | | ○ | △ |
| 3rd | b | | ○ | | ○ | | | ○ | | ◎ | |
| | c | ① | ○ | △ | ○ | ◎ | | ● | | | |
| 4th | | ③ | ○ | ◎ | ○ | ○ | ○ | | | | |
| | | ① | ● | ○ | ○ | △ | ○ | | | | |
| 5th | | | | ○ | ○ | | ○ | | | ○ | |

FIG. 54

|  |  |  | Clutch Means | | | | | Brake Means | | | |
|---|---|---|---|---|---|---|---|---|---|---|---|
|  |  |  | K1 | K2 | K3 | K4 | K5 | B1 | B2 | B3 | B4 |
| 1st |   | ③ | ○ |   |   | ○ | △ | ○ | ● |   |   |
| 2nd | b | ① | ○ |   |   | ● |   | ○ |   | ○ | △ |
| 3rd | b |   | ○ |   | ○ |   |   | ○ |   | ◎ |   |
|     | c | ① | ○ | ◎ | ○ | △ |   | ● |   |   |   |
| 4th |   | ① | ○ | ○ | ○ | ◎ | ○ |   |   |   |   |
|     |   | ④ | △ | ○ | ○ | ● | ○ |   |   |   |   |
| 5th |   |   |   | ○ | ○ |   | ○ |   |   | ○ |   |

FIG. 55

|  |  |  | Clutch Means | | | | | Brake Means | | | |
|---|---|---|---|---|---|---|---|---|---|---|---|
|  |  |  | K1 | K2 | K3 | K4 | K5 | B1 | B2 | B3 | B4 |
| 1st |   | ③ | ○ |   |   | ○ | △ | ○ | ● |   |   |
| 2nd | b | ① | ○ |   |   | ● |   | ○ |   | ○ | △ |
| 3rd | b |   | ○ |   | ○ |   |   | ○ |   | ◎ |   |
|     | c | ① | ○ | △ | ○ | ◎ |   | ● |   |   |   |
| 4th |   | ③ | ○ | ◎ | ○ | ○ | ○ |   |   |   |   |
|     |   | ④ | △ | ○ | ○ | ● | ○ |   |   |   |   |
| 5th |   |   |   | ○ | ○ |   | ○ |   |   | ○ |   |

FIG. 56

|  |  |  | Clutch Means | | | | | Brake Means | | | |
|---|---|---|---|---|---|---|---|---|---|---|---|
|  |  |  | K1 | K2 | K3 | K4 | K5 | B1 | B2 | B3 | B4 |
| 1st |   | ③ | ○ |   |   | ○ | △ | ○ | ● |   |   |
| 2nd | b | ② | ○ |   |   | ◎ |   | ○ |   | △ | ○ |
|     |   | ② | ○ |   |   | △ |   | ○ |   | ◎ | ● |
| 3rd | b |   | ○ |   | ○ |   |   | ○ |   | ◎ |   |
|     | c | ① | ○ | ◎ | ○ | △ |   | ● |   |   |   |
| 4th |   | ① | ● | ○ | ○ | △ | ○ |   |   |   |   |
| 5th |   |   |   | ○ | ○ |   | ○ |   |   | ○ |   |

FIG.57

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ③ | ○ | | | ○ | △ | ○ | ● | | |
| 2nd | b | ② | ○ | | | ◎ | | ○ | | △ | ○ |
| | | ② | ○ | | | △ | | ○ | | ◎ | ● |
| 3rd | b | | ○ | | ○ | | | ○ | | ◎ | |
| | c | ① | ○ | △ | ○ | ◎ | | ● | | | |
| 4th | | ③ | ○ | ◎ | ○ | ○ | ○ | | | | |
| | | ① | ● | ○ | ○ | △ | ○ | | | | |
| 5th | | | | ○ | ○ | | ○ | | | ○ | |

FIG.58

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ③ | ○ | | | ○ | △ | ○ | ● | | |
| 2nd | b | ② | ○ | | | ◎ | | ○ | | △ | ○ |
| | | ② | ○ | | | △ | | ○ | | ◎ | ● |
| 3rd | b | | ○ | | ○ | | | ○ | | ◎ | |
| | c | ① | ○ | ◎ | ○ | △ | | ● | | | |
| 4th | | ① | ○ | ○ | ○ | ◎ | ○ | | | | |
| | | ④ | △ | ○ | ○ | ● | ○ | | | | |
| 5th | | | | ○ | ○ | | ○ | | | ○ | |

FIG.59

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ③ | ○ | | | ○ | △ | ○ | ● | | |
| 2nd | b | ② | ○ | | | ◎ | | ○ | | △ | ○ |
| | | ② | ○ | | | △ | | ○ | | ◎ | ● |
| 3rd | b | | ○ | | ○ | | | ○ | | ◎ | |
| | c | ① | ○ | △ | ○ | ◎ | | ● | | | |
| 4th | | ① | ○ | ○ | ○ | ◎ | ○ | | | | |
| | | ④ | △ | ○ | ○ | ● | ○ | | | | |
| 5th | | | | ○ | ○ | | ○ | | | ○ | |

|  |  | Clutch Means |  |  | K4 |  | K5 | Brake Means |  | B2 | B3 | B4 |
|---|---|---|---|---|---|---|---|---|---|---|---|---|
|  |  | K1 | K2 | K3 | 22 | 20 |  | B1 | | | | |
|  |  |  |  |  |  |  |  | 42 | 40 | | | |
| 1st |   | ○ |   |   | ※ | ○ |   | ○ | ○ | ○ |   |   |
| 2nd | a | ○ |   |   |   |   |   | ※ | ○ | ○ |   | ○ |
|     | b | ○ |   |   | ○ | ○ |   | ※ | ○ |   | ○ | ○ |
|     |   | ○ |   |   | ※ | ○ |   | ○ | ○ |   | ○ |   |
| 3rd | b | ○ |   | ○ |   |   |   | ※ | ○ |   | ○ |   |
|     | c | ○ | ○ | ○ | ○ |   |   |   | ○ |   |   |   |
| 4th | a | ○ | ○ | ○ | ○ |   | ○ |   |   |   |   |   |
|     |   |   | ○ | ○ | ※ | ○ | ○ |   |   |   |   |   |
| 5th | a |   | ○ | ○ |   |   | ○ |   |   |   | ○ |   |

| | Clutch Means | | | | | | | Brake Means | | | |
|---|---|---|---|---|---|---|---|---|---|---|---|
| | K1 | K2 | K3 | K4 | | K5 | | B1 | | B2 | B3 |
| | | | | 22 | 20 | 51 | 50 | 42 | 40 | | |
| 1st | ○ | | | ○ | ○ | ※ | ○ | ※ | ○ | ○ | |
| | ○ | | | ○ | ○ | ※ | ○ | ※ | ○ | | |
| 2nd  b | ○ | | | ※ | ○ | | | ○ | ○ | | ○ |
| 3rd  b | ○ | | ○ | | | | | ※ | ○ | | ○ |
|    c | ○ | ○ | ○ | ○ | | | | ※ | ○ | | |
| 4th  a | ○ | ○ | ○ | ○ | | | ○ | | | | |
| | | ○ | ○ | ※ | ○ | | ○ | | | | |
| 5th  a | | ○ | ○ | | | | ○ | | | | ○ |

| | | Clutch Means | | | K4 | | K5 | Brake Means | | | | B3 |
|---|---|---|---|---|---|---|---|---|---|---|---|---|
| | | K1 | K2 | K3 | 22 | 20 | | B1 | | B2 | | |
| | | | | | | | | 42 | 40 | 61 | 60 | |
| 1st | | ○ | | | ○ | ○ | | ○ | ○ | ※ | ○ | |
| 2nd | b | ○ | | | ※ | ○ | | ○ | ○ | | | ○ |
| 3rd | b | ○ | | ○ | | | | ※ | ○ | | | ○ |
| | c | ○ | ○ | ○ | ○ | | | ※ | ○ | | | |
| 4th | a | ○ | ○ | ○ | ○ | | ○ | | | | | |
| | | | ○ | ○ | ※ | ○ | ○ | | | | | |
| 5th | a | | ○ | ○ | | | ○ | | | | | ○ |

AUTOMATIC TRANSMISSION AND SPEED CHANGE CONTROL METHOD

BACKGROUND OF THE INVENTION

The present invention relates to an automatic transmission for executing speed changes by changing the engagement/disengagement states of a plurality of frictional engagement means such as clutch means and brake means and, more particularly, to an automatic transmission having plural kinds of combinition patterns of the engagement/disengagement of the frictional engagement means for settng one of several speed stages (hereinafter simply referred to as speeds).

An automatic transmission for a vehicle is generally constructed by using a plurality sets of planetary gear mechanisms, by connecting predetermined ones of rotary members of sun gears, ring gears or carriers of the individual sets, by connecting any of the rotary members to an input shaft through clutch means, by holding another rotary member selectively by brake means, and by connecting an output shaft to still another rotary member. In the automatic transmission of this kind, the number of speeds to be set, the gear ratios at the individual speeds, and/or the numbers of revolutions and loaded torques of the rotation members are changed in various manners depending upon the number of planetary gear mechanisms used, the manner of connecting the individual rotary members, or the number of or manner of arrangement of the frictional engagement means such as the clutch means or the brake means so that a remarkably large number of ratios can be made in principle. (The "number of revolutions" is defined herein as the number of revolutions of a rotary member of a gear train for each rotation of an element external to the gear train, e.g., an input member. All conceivable in principle could not be put to practical use. It is not easy to create an automatic transmission which can meet the practical requirements sufficiently such as feasible production, small size and light weight, sufficient speed change controllability or excellent durability. Even an automatic transmission which is enabled to set five forward and one reverse speeds by using three planetary gear sets, for example, may have an overlarge gear ratio at the reverse speed in dependence upon the manner of arranging the frictional engagement means such as the clutches or the gear ratios (i.e., the ratios of the number of teeth of the sun gears to that of the ring gears) of the individual planetary gear sets. It is necessary for this automatic transmission to have high capacity frictional engagement means. This automatic transmission has problems in deterioration of the durability of the frictional engagement means or the bearings. In order to solve this problem, there has been proposed an automatic transmission in which the gear ratio at the reverse speed is made similar to that at the forward first speed, as disclosed in Japanese Patent Laid-Open No. Sho 60-57036.

The structure of the automatic transmission according to this proposal will be briefly described in the following. This structure is constructed mainly of three sets of single pinion type planetary gear mechanisms. The sun gear of the first planetary gear set and the sun gear of the second planetary gear set are always or selectively connected, and the sun gear of the first planetary gear set and the carrier of the second planetary gear set are connected, if necessary, through a clutch. Moreover, the ring gear of the second planetary gear set and the ring gear of the third planetary gear set are connected to each other and to the carrier of the first planetary gear set. Still moreover, the carrier of the second planetary gear set and the sun gear of the third planetary gear set are connected through a clutch. The input shaft is connected on one hand through a clutch to both the sun gear of the first planetary gear and the sun gear of the second planetary gear set and on the other hand through another clutch to the ring gear of the first planetary gear set. On the other hand, the output shaft is connected to the carrier of the third planetary gear set. Moreover, the brake means for stopping rotation is exemplified by both a brake for holding the sun gear of the first planetary gear set and the sun gear of the second planetary gear set, which are connected to each other, and a brake for holding the sun gear of the third planetary gear set. In this automatic transmission disclosed in Japanese Patent Laid-Open No. Sho 60-57036, at the forward first speed, the rotations of the carrier of the second planetary gear set are blocked by engaging the brake for holding the sun gear of the third planetary gear set and simultaneously by engaging the clutch for connecting the carrier of the second planetary gear set to the former sun gear. At the reverse speed, too, the carrier of the second planetary gear set is likewise held. Moreover, the gear ratios at the forward first and reverse speeds have similar values.

Incidentally, in the Specification of Japanese Patent Laid-Open No. Sho 60-57036, the structure, in which a one-way clutch is interposed between the carrier of the second planetary gear set and the casing, is presented in a skeleton diagram. With this presentation, however, there is neither a clutch and brake application chart corresponding thereto nor any description of the speeds to be set. With the structure having the additional one-way clutch, therefore, it is conceivalbe that the individual speeds are set likewise as in other embodiments disclosed therein.

In the automatic transmission of the prior art thus far described, the speeds are composed of five forward and one reverse speeds and of a 2.5th speed and a 3.5th speed so that the automatic transmission can set seven forward speeds and one reverse speed as a whole. However, only a single combination of the engagement/disengagement of the clutches and brakes is available for setting each of the individual speeds. As a result, the automatic transmission of the prior art may have high shifting shocks or may be obliged to execute complex controls so as to reduce the shifting shocks. In other words, the automatic transmission of the prior art is given only one kind of combination pattern of the engagement/disengagement of the frictional engagement means for setting the individual speeds so that it cannot avoid an increase, if necessary at the time of a speed change from a predetermined speed to another, in the rotational fluctuations of any rotary member. As a result, the moment of inertia accompanying the speed change is increased to cause rapid fluctuations of the output torque, thus raising disadvantages that the shifting shocks are high and that the durability of the bearings or the like is reduced. These disadvantages also occur in case of an increase of the number of revolutions of a rotary member having no direct participation in the transmission of the torque when a predetermined speed is to be set. Then, the rotational fluctuations of that rotary member may be increased at the time of the speed change to increase the shifting shocks. Still the worse, these unnecessary rotations will naturally cause friction between the adjacent members, thus raising another disadvantage that the friction will generate heat and progress wear.

If, on the other hand, even the unnecessary rotations have to cause the fluctuations for the speed change, the automatic transmission has to be equipped with not only the clutch means and the brake means but also an accumulator, a timing value or an electromagnetic valve for controlling the foregoing means. This results in other disadvantages that the speed change controls are complicated and that the system is large-sized to increase the weight and the cost.

Here, in the automatic transmission using a plurality sets of planetary gear mechanisms, clutches are interposed between the rotary members such as the sun gears of the individual planetary gear sets to increase the number of the speeds to be set and the number of the combination patterns of the engagement/disengagement of the frictional engagement means for setting a predetermined speed. As a result, the aforementioned automatic transmission disclosed in Japanese Patent Laid-Open No. Sho 60-57036 is equipped with a clutch interposed between the rotary members of the planetary gear sets, and it may have a plurality of kinds of combination patterns of the engagement/disengagement of the clutches and brakes for setting any speed. If so, however, the abovespecified Laid-Open has failed to describe not only the presence of plural combination patterns but also a method of utilizing the combination patterns of the engagement/disengagement of the clutches and brakes.

SUMMARY OF THE INVENTION

An object of the present invention is to provide an automatic transmission which is enable to have less shifting shocks and to improve durability by selecting a suitable one from the plural kinds of combination patterns of the engagement/disengagement of the frictional engagement means for setting a predetermined speed on the basis of the number of revolutions of any rotary member of the gear train.

Thus, the automatic transmission according to the present invention is constructed to have a plurality of kinds of combination patterns of the engagement/disengagement of the frictional engagement means for setting one of speeds, to have its gear train to increase or decrease the number of revolutions of a rotary member in accordance with a certain pattern, and to have speed change control means for selecting the pattern for setting said speed.

Another object of the present invention is to provide an automatic transmission which is enabled to facilitate the speed change control with less shifting shocks by utilizing the plural kinds of combination patterns of the frictional engagement means for setting a predetermined speed.

In order to achieve this object, the shift control means of the automatic transmission of the present invention is constructed to change the combination pattern of the engagement/disengagement of the frictional engagement means for setting a predetermined speed, prior to execution of a speed change from that speed to another speed, into such another pattern that the number of revolutions of the rotary members of the gear train may not be varied.

Moreover, the speed change control means in the automatic transmission of the present invention is adapted to select, as the combination pattern of said engagement/disengagement of said frictional engagement means for setting said predetermined speed to be changed from a present speed, such a combination pattern of said engagement/disengagement of said frictional engagement means that the sum of the fluctuating number of revolutions of said any rotary member for a time period from the present speed to said predetermined speed and the fluctuating number of revolutions of said any rotary member for a time period from said predetermined speed to said another speed may be decreased.

Still moreover, the speed change control means in the automatic transmission of the present invention is adapted: to select, as the combination pattern of the engagement/disengagement of said frictional engagement means for setting said predetermined speed, such a pattern that the number of the frictional engagement means to have their engagement/disengagement states changed at the time of a speed change from said another speed; and to change the combination pattern of the engagement/disengagement of said frictional engagement means for setting said predetermined speed, in case the number of revolutions of said any rotary member at said selected pattern exceeds a predetermined reference value, from said selected pattern into such another pattern that the number of revolutions of said any rotary member may be no more than said reference value.

Still moreover, the speed change control means in the automatic transmission of the present invention is adapted to change the combination pattern of the engagement/disengagement of said frictional engagement means for setting said predetermined speed, at the time of a speed change from said predetermined speed to another speed, into such another pattern that the fluctuating number of revolutions of said any rotary member accompanying said speed may be decreased.

Furthermore, the speed change control means in the automatic transmission of the present invention is adapted: to select, as the combination pattern of the engagement/disengagement of said frictional engagement means for setting said predetermined speed, a pattern for a large fluctuating number of revolutions of said any rotary member, if the number of revolutions of another rotary member is no more than a predetermined value at the time of a speed change to said predetermined speed; and to select a pattern for small fluctuating number of revolutions of said any rotary member if the number of revolutions of another rotary member exceeds a predetermined value.

In the speed change control method of the present invention, on the other hand, a plurality of kinds of combination patterns are provided for the engagement/disengagement of the frictional engagement means for setting one of speeds, and a gear train is constructed to increase or decrease the number of revolutions of a rotary member according to a certain pattern so that a predetermined one of the plural kinds of engagement/disengagement patterns may be selected so as to decrease the fluctuating number of revolutions of said rotary member when said predetermined speed is to be set.

According to the method of the present invention, such a pattern that the fluctuating number of revolutions of said rotary member may be below a predetermined value is selected as the engagement/disengagement pattern for setting said predetermined speed.

According to the method of the present invention, as the combination pattern of said engagement/disengagement of said frictional engagement means for setting said predetermined speed, there is selected such a combination pattern of said engagement/disengagement of said frictional engagement means that the sum of the fluctuating number of revolutions of said any rotary member for a time period from the present speed to said predetermined speed and the fluctuating number of revolutions of said any rotary member for a time period from said predetermined speed to said another speed may be decreased.

According to the method of the present invention, moreover, as the combination pattern of the engagement/disengagement of said frictional engagement means for setting said predetermined speed, there is selected such a pattern that the number of the frictional engagement means to have their engagement/disengagement states changed at the time of a speed change from said another speed, and wherein the combination pattern of the engagement/disengagement of said frictional engagement means for setting said predetermined speed is changed, in case the number of revolutions of said any rotary member at said selected pattern exceeds a predetermined reference value, from said selected pattern into such another pattern that the number of revolutions of said any rotary member may be no more than said reference value.

According to the method of the present invention, still moreover, the combination pattern of the engagement/disengagement of said frictional engagement means for setting said predetermined speed is changed, at the time of a speed change from said predetermined speed to another speed, into such another pattern that the fluctuating number of revolutions of said any rotary member accompanying said speed may be decreased.

According to the method of the present invention, furthermore, as the combination pattern of the engagement/disengagement of said frictional engagement means for setting said predetermined speed, a pattern for a large fluctuating number of revolutions of said any rotary member is selected if the number of revolutions of another rotary member is no more than a predetermined value at the time of a speed change to said predetermined speed, and wherein a pattern for small fluctuating number of revolutions of said any rotary member is selected if the number of revolutions of another rotary member exceeds a predetermined value.

The above and further objects and novel feature of the present invention will more fully appear from the following detailed description when the same is read in connection with the accompanying drawings. It is to be expressly understood, however, that the drawings are for purpose of illustration only and is not intended as a definition of the limits of the invention.

BRIEF DESCRIPTION OF THE DRAWINGS

FIG. 2 is a clutch and brake application chart of the automatic transmission;

FIG. 3 is a chart tabulating the relative numbers of revolutions of individual rotary members;

FIGS. 4 to 6 are clutch and brake application charts for setting the major five speeds;

FIG. 9 is a chart tabulating the frictional engagement means to be disengaged for a speed change and the engagement/disengagement patterns to be set for the same;

FIGS. 10 to 25 are clutch and brake application charts for setting the major speeds by suppressing the rotational fluctuations at the time of the speed change and the unnecessary rotations;

FIG. 26 is a more specific clutch and brake application chart for the major five speeds;

FIGS. 28 to 32 are skeleton diagrams showing other examples of the gear train in the automatic transmission of the present invention;

FIG. 33 is a clutch and brake application chart for the major speeds of the automatic transmission equipped with the gear train shown in FIG. 32;

FIG. 34 is a skeleton diagram showing still another example of the gear train;

FIG. 35 is a clutch and brake application chart for the major speeds of the automatic transmission equipped with the gear train shown in FIG. 34;

FIGS. 36 to 41 are skeleton diagrams showing other examples of the gear train in the automatic transmission of the present invention, respectively;

FIG. 42 is a clutch and brake application chart for the automatic transmission equipped with the gear trains shown in FIGS. 36 to 41;

FIG. 43 is a chart tabulating the relative rotations of the individual rotary member of the same;

FIGS. 44 to 59 are clutch and brake application charts for the major five speeds according to the method of the present invention for the automatic transmission equipped with the gear trains shown in FIGS. 36 to 41;

DETAILED DESCRIPTION OF THE PREFERRED EMBODIMENTS

Figure 1:
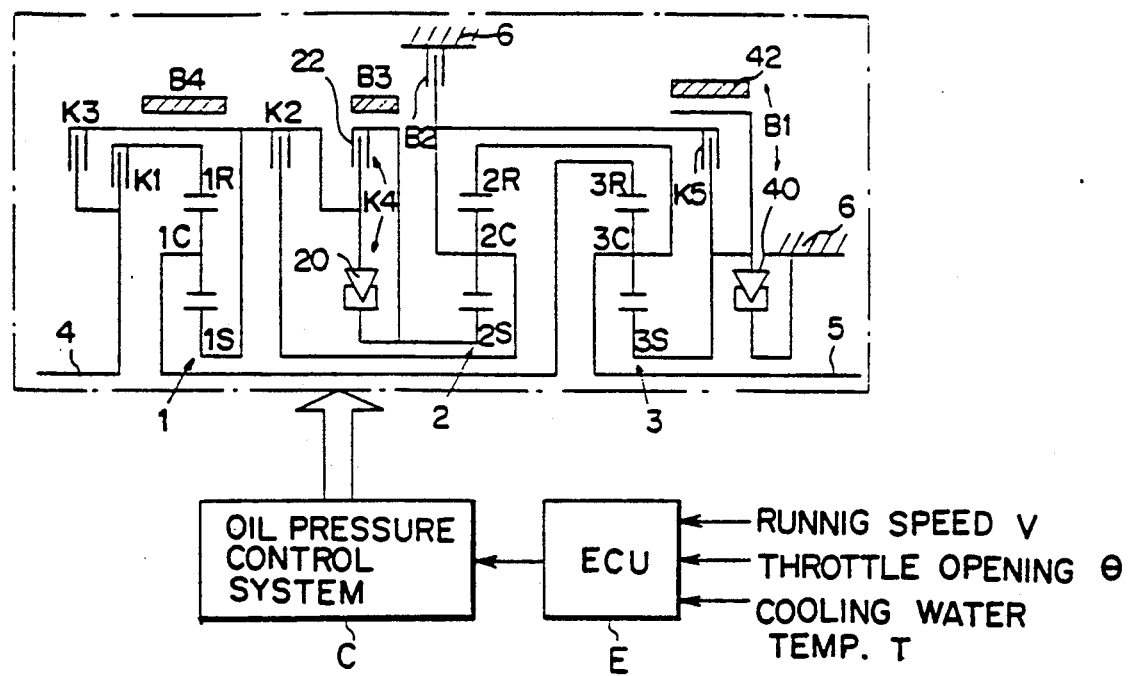
FIG. 1 is a skeleton diagram showing one embodiment of the automatic transmission according to the present invention.

An embodiment, as shown in FIG. 1, has its gear train constructed mainly of three sets of single-pinion type planetary gear mechanisms 1, 2 and 3, the individual components of which are connected, as follows. The carrier 1C of the first planetary gear set 1 and the ring gear 3R of the third planetary gear set 3 are so connected that they may rotate together, and the ring gear 2R of the second planetary gear set 2 and the carrier 3C of the third planetary gear set 3 are also so connected that they may rotate together. Moreover, the sun gear 1S of the first planetary gear set 1 is connected at one hand through second clutch means K2 to the carrier 2C of the second planetary gear set 2 and on the other hand through fourth clutch means K4 to the sun gear 2S of the second planetary gear set 2. The carrier 2C of the second planetary gear set 2 in turn is connected through fifth clutch means K5 to the sun gear 3S of the third planetary gear set 3.

Incidentally, the connecting structure of the components thus far described is exemplified by one which is adopted in an existing automatic transmission such as a hollow or solid shaft or a suitable connecting drum.

An input shaft 4 is connected to a (not-shown) engine through (not-shown) power transmission means such as a torque converter or a fluid coupling. Between the input shaft 4 and the ring gear 1R of the first planetary gear set 1, there is interposed first clujtch means K1 for connecting the two members selectively. Between the input shaft 4 and the sun gear 1S of the first planetary gear set 1, on the othe hand, there is interposed third clutch means K3 for connecting the two members selectively.

Of the first to fifth clutch means K1 to K5 enumerated above, the fourth clutch means K4 is composed of a one-way clutch 20 and a multiple disc clutch 22 which are positioned in parallel with each other, whereas the other clutch means are composed of multiple disc clutches. Incidentally, it is needless, for practical purposes, to say that suitable intermediate members such as connecting drums can be disposed as connecting members for the individual clutch means K1, K2, K3, K4 and K5.

As brake means for blocking the rotations of the rotary members of the aforementioned planetary gear sets 1, 2 and 3, on the other hand, there are provided: first brake means B1 for blocking the rotation of the sun gear 3S of the third planetary gear set 3 selectively; second brake means B2 for blocking the rotation of the carrier 2C of the second planetary gear set 2 selectively; third brake means B3 for blocking the rotation of the sun gear 2S of the second planetary gear set 2 selectively; and fourth brake means B4 for blocking the rotation of the sun gear 1S of the first planetary gear set 1 selectively. Of these brake means, the first brake means B1 is composed of: a one-way clutch 40 interposed between the sun gear 3S of the third planetary gear set 3 and a transmission casing (which will be shortly referred to as the "casing") 6; and a band brake 42 positioned in parallel with the one-way clutch 40. On the other hand, the second brake means B2 is composed of a multiple disc brake, and the third brake means B3 and the fourth brake means B4 are composed of individual band brakes. Incidentally, for practical purposes, it is quite natural that suitable connecting members can be interposed between those brake means B1, B2, B3 and B4 and either the individual components to be braked by the brake means B1 to B4 or the casing 6.

Moreover, an output shaft 5 for transmitting torque to the propeller shaft and the counter gear (although both of them are not shown) is connected to both the ring gear 2R of the second planetary gear set 2 and the carrier 3C of the third planetary gear set 3, which in turn are connected to each other.

The automatic transmission having the structure shown in FIG. 1 is enabled in principle to establish ten forward and one reverse speeds, of which five forward and one reverse speeds are major, by adding the so-called "2.2 speed", "2.5 speed" and "2.7 speed" between the forward second and third speeds and the so-called "3.2 speed" and "3.5 speed" between the forward third and fourth speeds. At the speeds other than the 2.2 speed, the 2.7 speed, the 3.2 speed and the 3.5 speed, moreover, there are a plurality of combinations of engagement and disengagement (i.e., the so-called "engagement/disengagement patterns) for the clutch means and the brake means to establish a speed of concern, as tabulated in FIG. 2. Still moreover, the number of revolutions of the rotary members of the individual planetary gear sets 1, 2 and 3 at the individual speeds are tabulated in FIG. 3. Here, in FIG. 2: the circles $\bigcirc$ indicate the engagements; the blanks indicate the disengagements; and the asterisks * indicate allowances of the engagements. With these aterisks *, futhermore: the fifth clutch means K5 and the first brake means B1 at the first speed are free from any resulting change in the gear ratio or the rotating states even if they are disengaged; the first brake means B1 according to the pattern of the column b at the fourth speed has no resulting change in the gear ratio but its rotating state changed if it is disengaged; and the fourth clutch means K4 and the third brake means B3 according to the pattern of the column b at the second speed are free from any resulting change in the gear ratio and the rotating states even if they are disengaged but if the other asterisked means are engaged. Moreover, the columns of FIGS. 2 and 3, as designated at a, b, c, - - -, and so on at the second, third, fourth, fifth and reverse speeds, indicate those engagement/disengagement patterns for setting the corresponding speeds, in which the numbers of revolutions of the rotary components of the planetary gear sets are different. Still moreover, the circled numerals ①, ②, ③, - - -, and so indicate the kinds of the engagement/disengagement patterns, in which the numbers of revolutions of the rotary components of the planetary gear sets are not different. Furthermore, the values numerated in FIG. 3 indicate the ratios in case the gear ratios (i.e., the ratios of the teeth of the sun gears and the ring gears) of the planetary gear sets 1, 2 and 3 are indicated at $\rho 1 = 0.450$, $\rho 2 = 0.405$ and $\rho 3 = 0.405$, respectively, and in case the number of input revolutions is "1".

FIG. 2 tabulates the speeds which can be set in principle. From these, for practical purposes, there are selected the speeds which are excellent in power performance or accelerability. Specifically, speeds for establishing gear ratio having a relation of geometric series are selected as major ones. Moreover, the engagement/disengagement patterns for setting the individual speeds are selectd from those tabulated in FIG. 2 in view of the advantages in speed change controllability or durability. In the embodiment shown in FIG. 1, on the other hand, the fourth clutch means K4 and the first brake means B1 are equipped with the one-way clutches 20 and 40, respectively. If, therefore, the relative rotation of the sun gear 1S of the first planetary gear set 1 and the sun gear 2S of the second planetary gear set 2 is in the direction to engage the one-way clutch 20, the fourth clutch means K4 is ordinarily maintained in the engaged state by the one-way clutch 20 and effects the engagement of the multiple disc clutch 22 when the braking by the engine is required. If, on the contrary, the relative rotation of the aforemetnioned sun gears 1S and 2S is in the direction to disengage the one-way clutch 20, the multiple disc clutch 22 is engaged to bring the fourth clutch means K4 into the engaged state. A similar operation applies to the first brake means B1. If the rotations of the sun gear 3S of the third planetary gear set 3 is in the direction to engage the one-way clutch 40, this clutch 40 is engaged to bring the first brake means B1 into the engaged state, and the multiple disc brake 42 is engaged when the engine braking is required. If, on the contrary, the rotation of the sun gear 3S of the third planetary gear set 3 is in the direction to disengage the one-way clutch 40, the multiple disk brake 42 is engaged to bring the first brake means B1 into the engaged state.

In the automatic transmission shown in FIG. 1, too, the settings of the individual speeds tabulated in FIG. 2 are performed like the existing automatic transmission in accordance with the load on the engine, as represented by the throttle opening, and the running speed of the automobile. As this control means, there are provided: an oil pressure control system C for supplying and releasing oil pressures to engage/disengage the clutch means and brake means thus far recited; and an electronic control unit (as will be abbreviated to "ECU") E for outputting electric instructions to the oil pressure control system C in accordance with input data such as the automotive running speed V, the throttle opening $\theta$ and/or the cooling water temperature T.

In the automatic transmission shown in FIG. 1, as could be seen from FIGS. 2 and 3, there are several kinds of engaging/disengaging patterns for the frictional engagement means to set the major first, second, third, fourth and fifth speeds having forward gear ratios taking into account that the relations of geometric series substantially, and the numbers of revolutions of the rotary members of the individual planetary gear sets 1, 2 and 3 are different for the individual engagement/disengagement patterns. As a result, the rotational fluctuations to be established in the individual rotary members are different according to the engagement/disengagement pattern selected, in case the speed change is to be accomplished to an adjacent speed. Let it be assumed that the engagement/disengagement pattern of the column a is selected as that for setting the second speed in case the gear is shifted from the first to second speeds, for example. Then, the number of revolutions of the sun gear 2S of the second planetary gear set 2 is changed from $-0.78$ to $-1.21$ with a difference of 0.43, but no fluctuation occurs in the rotation of the carrier 2C. If, on the contrary, the pattern of the column b is selected, the sun gear 2S is stopped to establish a fluctuation width of 0.78, and the number of revolutions of the carrier 2C is at 0.35 to establish a different of 0.35. At another speed, too, the fluctuation width of the numbers of revolutions of the rotary members are different depending upon the engagement/disengagement pattern to be selected for a speed change to an adjacent speed. This difference could be easily seen from FIG. 3.

On the other hand, any of the engagement/disengagement patterns, as tabulated in FIG. 2, could be selected in principle. Since, however, it is necessary for practical purposes to avoid such a pattern as will be accompanied by disadvantages such as a large number of frictional engagement means to have their engaged/disengaged states changed so as to effect the speed change, the engagement/disengagement patterns to be selected are restricted.

In the automatic transmission having the structure shown in FIG. 1, therefore, the degree of freedom for the selections is high because there are several kinds of patterns for setting the individual speeds, but the size, strength, durability and cost will be very different depending upon which of the engagement/disengagement patterns is to be selected.

In the automatic transmission, therefore, the speed changes are so controlled as to suppress the rotational fluctuations of the rotary members accompanying the speed change and to decrease as small as possible the number of the frictional means to have their engagement/disengagement states changed, as will be specifically described in the following.

It is important for improving the riding comfort of the vehicle that the shifting shocks be minimized when a speed change is to be executed. For this purpose, the engagement/disengagement pattern to be selected for setting the major speeds (e.g., the forward first to fifth speeds) tabulated in FIG. 2 is exemplified as a pattern having the so-called "simultaneous (or multiple) speed changes" for changing the engagement/disengagement states of three or more frictional engagement means when the speed change is to be executed. Specifically, the speed changes between the adjacent speeds, e.g., the first and second speeds can be executed without any of the simultaneous speed changes if any pattern of the first speed and any pattern in the column a or b of the second speed are selected. In case the pattern ① of the column a is selected as the second speed, the speed change can be executed by changing the engagement/disengagement states of the two clutch means, i.e., the second clutch means K2 and the fourth clutch means K4. If, on the other hand, the pattern ③ is selected as the first speed, the pattern ① of the column b is selected as the second speed so that the speed change can be executed by changing the two engagement/disengagement states of the third brake means B3 and the second brake means B2.

On the other hand, the speed change between the second and third speeds can be executed without any simultaneous speed change if the pattern of the column a or b is selected as the second speed and if the pattern of the column a or d is selected as the third speed. In case the pattern ⑤ of the column a is selected as the second speed, the speed change can be executed without any simultaneous speed change if the pattern ① of the column a or the pattern of the column b or d is selected as the third speed. Similarly, the pattern ② of the column b is selected as the second speed, the speed change can be executed without any simultaneous speed change if the pattern ① of the column a or the pattern of the column b or d is selected as the third speed.

Moreover, the speed change between the third and fourth speeds can be executed without any simultaneous speed change: by selecting the pattern of the column a as the fourth speed in case the pattern of the column a of FIG. 2 is selected as the third speed; by selecting the pattern of the column a or b as the fourth speed in case the pattern of the column c is selected as the third speed; and by selecting the pattern of the column a or b as the fourth speed in case the pattern of the column d is selected as the third speed. In other words, the patterns of the column a of the fourth speed are ones for effecting either the engagements of at least three clutch means, i.e., the second clutch means K2 to the fourth clutch means K4 or the engagements between the first clutch means K1 and at least three other clutch means. On the other hand, the clutch means to be engaged according to the pattern of the column b of the third speed are two, i.e., first clutch means K1 and the third clutch means K3. Upon the speed change from this pattern to the fourth speed, therefore, the engagement/disengagement states of three or more frictional engagement means are interchanged. Moreover, the clutch means to be engaged according to the pattern of the column b of the fourth speed are limited to three, i.e., the second to fourth clutch means K2, K3 and K4. As a result, the speed change from the patterns of the column a for disengaging the second clutch means K2 and the fourth clutch means K4 and the pattern of the column b of the patterns of the third speed is accompanied by the simultaneous speed change. Thus, the aforementioned ones are the speed change patterns between the third and fourth speeds without any simultaneous speed change.

Moreover, the speed change between the fourth and fifth speeds can be executed without any simultaneous speed change if the pattern of the column a or b is selected as the fourth speed and if the pattern of any of the columns a to c is selected as the fifth speed. In other words, the frictional engagement means to be engaged without fail at the fifth speed are the second and third clutch means K2 and K3 and the third brake means B3, whereas the patterns of the columns a and b of the fourth speed are those for engaging the second to fourth clutch means K2, K3 and K4 as the frictional engagement means to be engaged without fail. As a result, the speed change to the fifth speed can be executed without any simultaneous speed change.

From the standpoint of executing the speed changes between the adjacent speeds (i.e., the 1st speed-the 2nd speed, the 2nd speed-the 3rd speed, the 3rd speed-the 4th speed, and the 4th speed-the 5th speed) while avoiding the so-called "simultaneous speed change", the aforementioned engagement/disengagement patterns could be selected. The fluctuations of the numbers of revolutions of the rotary members of the individual planetary gear sets 1, 2 and 3 in case the speed change is executed by selecting such engagement/disengagement patterns could be seen from FIG. 3, and the rotational fluctuations of the rotary members are variously different depending upon the patterns selected. In case, for example, the second speed is set according to the pattern of the column a so that the speed change is effected by changing that state into the pattern of the column a of the third speed, the sun gear 1S of the first planetary gear set 1 has its number of revolutions augmented from that in the stop state to the same number of revolutions as that of the input shaft 4, and its amount of fluctuations can be expressed as "1.00", which is the value for the rotational fluctuations larger than those of other rotary members. In case, on the other hand, the second speed is set according to the patterns of the column a and in case the third speed is set according to the pattern of the column b, the sun gear 2S of the second planetary gear set 2, which has been reversely rotated (i.e., in the direction opposite to that of the input shaft 4) at a speed of 1.21 times as large as the number of revolutions inputted to the gear set, is stopped, and its amount of fluctuations can be expressed as "1.21", which is the value for the rotational fluctuations larger than that of the aforementioned example. These rotational fluctuations of the rotary members will increase the shifting shocks or reduce durability. In the automatic transmission of FIG. 1, therefore, the engagement/disengagement patterns of the frictional engagement means for setting the individual speeds are so selected that the rotational fluctuations of the rotary members accompanying the speed changes between the adjacent speeds may be no more than a predetermined value. According to a pattern selected, for example, the rotational fluctuations of the rotary members is no more than "1.00", as expressed at a ratio in case the number of input revolutions is "1". According to these standards, no rotational fluctuations exceeding the value "1.00", will be selected no matter which of the patterns of the column a or the patterns of the column b the second speed might be set for. In order to set the second speed, therefore, either of the patterns of the column a or the patterns of the column b can be selected. In case, on the contrary, the second speed is set according to the patterns of the column a, the rotational fluctuations of the sun gear 2S of the second planetary gear set 2 will exceed the value "1.00" if the third speed is set according to a pattern other than those of the column a. As a result, no pattern other than those of the column a is selected for the third speed. In case, on the other hand, the state of the second speed is set according to the patterns of the column b, the rotational fluctuations of the sun gear 2S of the second planetary gear set 2 will exceeds the value "1.00" if the third speed is set according to the patterns of the column a or the pattern of the column d. For the third speed, therefore, the pattern of the column b or the pattern of the column c is selected. Here, the simultaneous speed change is caused upon the speed change to the fourth speed, as has been described hereinbefore, if the third speed is set according to the pattern of the column b. In case, moreover, the third speed is set according to the patterns of the column a, the speed change to the fourth speed cannot be set without the simultaneous speed change according to the patterns other than those of the column a, as has been described hereinbefore. If, moreover, the third speed is set according to the patterns of the column a and if the speed change from the former state is executed by setting the fourth speed according to the patterns of the column a, the rotational fluctuations of the sun gear 2S of the second planetary gear set 2 will exceed the value "1.00". Thus, the pattern of the column c is selected for the third speed.

In case the third speed is set according to the pattern of the column c, the speed change to the fourth speed is achieved without the simultaneous speed change if the fourth speed is set according to the patterns of the column a or the pattern of the column b, as has been described hereinbefore. In case, moreover, the fourth speed is set according to the patterns of the column a, the rotational fluctuations of the sun gear 3S of the third planetary gear set 3 will exceed the value "1.00", if the fifth speed is set according to the pattern of the column b, and the rotational fluctuations of the sun gear 2S of the second planetary gear set 2 will exceed the value "1.00" if the fifth speed is set according to the pattern of the column c. In case, therefore, the fourth speed is set according to the patterns of the column a, the pattern of the column a is selected for the fifth speed. If, on the other hand, the fourth speed is set according to the pattern of the column b, the rotational fluctuations of the sun gear 3S of the third planetary gear set 3 will exceed the value "1.00" if the pattern of the column b is selected for the fifth speed. In this case, therefore, the pattern of the column a or c is selected for the fifth speed.

The engagement/disengagement patterns of the frictional engagement means for setting the individual speeds thus selected are tabulated in the form of the clutch and brake application charts of the major five speeds in FIGS. 4 to 6.

If the speeds are changed in accordance with these charts, the rotational fluctuations of the rotary members will not exceed the value "1.00", as could seen from FIG. 3. As a result, the shifting shocks can be decreased while eliminating the so-called "simultaneous speed change", so that the speed change control can be facilitated.

Incidentally, in the speed change control according to the clutch and brake application chart of FIG. 6 of the aforementioned three kinds of charts, the fifth speed is set according to the pattern of the column c so that the number of revolutions of the ring gear 1R of the first planetary gear set 1 at the fifth speed is 2.41 times as large as the number of input revolutions. In the speed change control of the chart shown in FIG. 5, on the other hand, relative rotation is caused between the first planetary gear set 1 and the third planetary gear set 3 at the fourth speed, as could be seen from FIG. 3. From the standpoints of dropping the actual number of revolutions to maintain the durability and suppressing the relative rotations, therefore, the preferable one is the speed change control according to the chart of FIG. 4 of those three kinds of charts.

Figure 7:
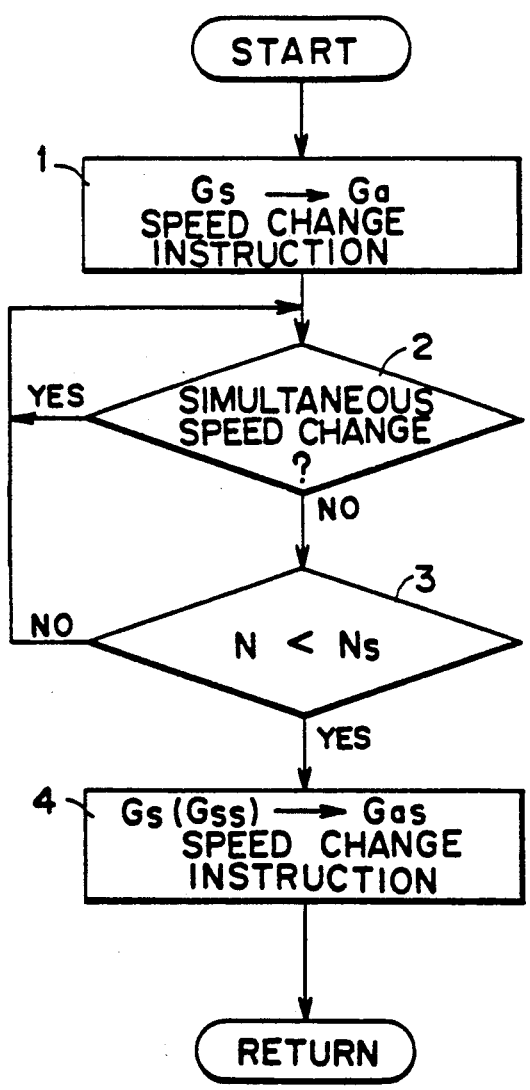
FIG. 7 is a flow chart for explaining the method of the present invention.

Here, the speed change controls according to the aforementioned charts can be executed by the following methods. According to one method, specifically, the engagement/disengagement patterns of the frictional engagement means for setting the individual speeds are stored in advance in the form of data, which are accessed in response to a speed change instruction to set the corresponding speed. According to another method, all the engagement/disengagement patterns for the individual speeds, as tabulated in FIG. 2, are stored, and a pattern free from any simultaneous speed change is selected by deciding one by one whether or not the engagement/disengagement patterns for setting the instructed speed in response to a speed change instruction will cause the simultaneous speed change, thereby to effect the speed change according to the aforementioned chart. The latter method will be briefly described in the following. In response to the automotive running speed V and the throttle opening θ, shown in FIG. 1, the control unit E for controlling an automatic transmission A outputs a speed change instruction to determine a speed to be set, in accordance with the speed change diagram using those data as its parameters. In the flow chart of FIG. 7, moreover, a speed change instruction from a present speed Gs to another Ga is outputted (at Step 1). In this case, whether or not the gear change is simultaneous is decided (at Step 2) by comparing the engagement/disengagement pattern setting the present speed Gs and the engagement/disengagement pattern for setting the change speed Ga. In case of the simultaneous speed change (i.e., if "YES" at Step 2), the decision is made upon another engagement/disengagement pattern is executed by returning the routine just before. In case the speed change is not simultaneous (i.e., if "NO" at Step 2), it is decided (at Step 3) whether or not the rotational fluctuations N of the rotary members in case the speed change is executed according to the engagement/disengagement pattern selected exceeds a predetermined reference value Ns. This reference value is exemplified by "1.00" in the foregoing description but can be unlimitedly set to an arbitrary value. In case this decision result is "NO", the procedure is returned to before Step 2 to decide another engagement/disengagement pattern. In case of "YES", a speed change instruction (Gs→Gas) according to the selected engagement/disengagement pattern is outputted (at Step 4).

Incidentally, the method of the present invention is to select the engagement/disengagement pattern so that the rotational fluctuations of the rotary members accompanying the speed change may not exceed the predetermined value. Therefore, the engagement/disengagement pattern for setting the present speed Gs may be replaced in advance by another engagement/disengagement pattern (Gss) having an equal gear ratio but a different number of revolutions of the rotary members.

As is apparent from FIGS. 2 and 3, the automatic transmission equipped with the gear train shown in FIG. 1 has several kinds of engagement/disengagement patterns, in which not the gear ratio but the numbers of revolutions of the rotary members are different. The behaviors of the vehicle are not changed because the torque of the output shaft is unvaried, even if those engagement/disengagement patterns are interchanged. Thus, a speed change control for advantageously reducing the shifting shocks and improving the durability can be executed, as will be described in the following, by changing the aforementioned engagement/disengagement patterns while setting a predetermined speed.

The automatic transmission equipped with the gear train shown in FIG. 1 is able to set the fifth speed in accordance with the patterns of the columns a, b and c, in which the number of revolutions of the rotary members are highly different, as tabulated in FIG. 3. In case the state immediately before setting the fifth speed is the pattern ① belonging to the column a of the fourth speed, the fourth clutch means K4 is disengaged,, and the third brake means B3 is engaged, as could seen from FIG. 2. In case the fourth clutch means K4 is held in its engaged state by the engagement of its one-way clutch 20, this one-way clutch 20 is automatically disengaged as the third brake means B3 is engaged, and the fifth speed is set according to the pattern of the column b. In case of the speed change to the fifth speed while the third speed is set according to the pattern of the column d, the pattern of the column b is selected as that for setting the fifth speed to output the instruction signal. Then, the first brake means B1 is disengaged, but the third brake means B3 is engaged. In case the first brake means B1 is held in its engaged state by the engagement of its one-way clutch 40, the one-way clutch 40 is automatically disengaged in accordance with the engagement of the third brake means B3 thereby to set the fifth speed.

If these engagement/disengagement patterns are interchanged, the number of the frictional engagement means to be interchanged for executing the speed changes can be limited to two to facilitate the speed change control. According to the pattern of the column b of the fifth speed, on the other hand, the number of revolutions of the sun gear 3S of the third planetary gear set 3 is about 2.40 times as large as the number of input revolutions, as could be seen from FIG. 3. If this number of input revolutions is large, the number of revolutions of that sun gear 3S is excessive. In the automatic transmission shown in FIG. 1, therefore, the numbers of revolutions of the rotary members composing the gear set are detected. If the detected value exceeds a predetermined value $a$, the pattern is changed to one for dropping the number of revolutions. More specifically, if the fifth speed is set according to the pattern of the column b, the electronic control unit E outputs an instruction signal for setting the fifth speed according to the pattern of the column a of FIG. 2 to change the engagement/disengagement pattern in accordance with the accompanying output of the oil pressure control system C, if the number of revolutions of the sun gear 3S of the third planetary gear set 3 exceeds the reference value $\alpha$ as the number of input revolutions increases. If, on the contrary, the number of input revolutions is low, the number of revolutions of the aforementioned sun gear 3S will not exceed the reference value $\alpha$ so that the pattern for setting the fifth speed remains as that of the column b.

Figure 8:
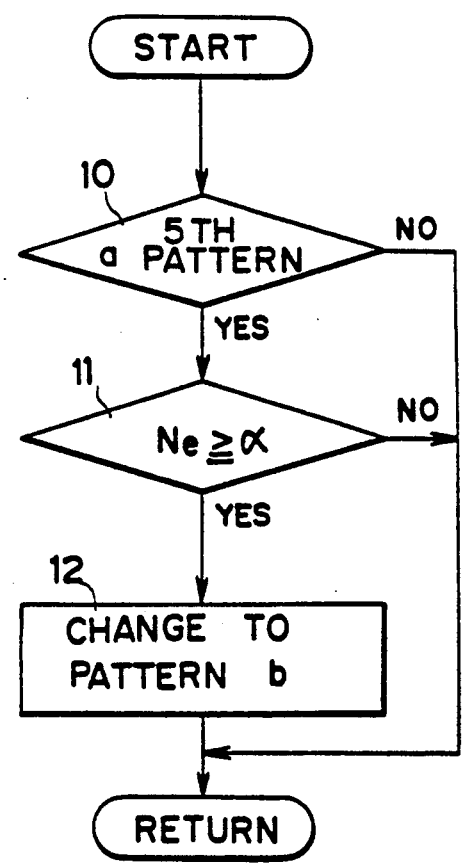
FIG. 8 is a flow chart for explaining another method of the present invention.

The controls described above are illustrated in FIG. 8. It is decided at Step 10 whether or not the fifth speed is set according to the pattern of the column b. If the decision results is "NO", the routine is returned. If "YES", on the contrary, the routine advances to Step 11 to decide whether or not the number Ne of revolutions of the rotary members exceeds the reference value $\alpha$. If the decision result is "NO", the routine is returned so that the fifth speed is left, as set according to the column b. If the decision result is "YES", on the contrary, the routine advances to Step 12, at which the engagement/disengagement pattern is changed for setting the fifth speed according to the pattern of the column a.

The detections of the numbers of revolutions of the rotary members for the aforementioned controls may be executed by providing sensors for the individual rotary members. Since, however, the relative numbers of rotations of the individual rotary members could be known in advance from the structure of the gear set, as tabulated in FIG. 3, the numbers of revolutions of the rotary members may be determined by detecting the number of revolutions of the input shaft 4 and by multiplying the detected number by the numerical values, as tabulated in FIG. 3. Since, moreover, the rotary members having their numbers of revolutions increased could be known in advance, it is sufficient to detect only the numbers of revolutions of the rotary members. Still moreover, these changes in the engagement/disengagement patterns may preferably be executed after the change to the corresponding speed has been executed without fail, so that the behaviors of the individual rotary members may be stabilized to prevent any abnormal shock or noise. Therefore, the controls may preferably be made to change the engagement/disengagement patterns either after the completion of the speed change has been confirmed by detecting the number of revolutions of a predetermined rotary member such as the output shaft 5 or after the lapse of a predetermined time period has been confirmed by means of a timer.

The aforementioned changes in the engagment-/disengagement patterns can be executed even at a speed in which there exist several kinds of patterns for setting the speed under consideration. The pattern to be selected and set at the time of the speed change is one for reducing the number of the frictional engagement means having their engagement/disengagement patterns interchanged upon the speed change. The change of the engagement/disengagement patterns is executed when the number or revolutions of any rotary member for that pattern exceeds the reference value $\alpha$. Moreover, these controls are executed by the actions of the aforementioned electronic control unit E and oil pressure control system C.

As a result, in the automatic transmission shown in FIG. 1, the changes in the engagement/disengagement patterns of the frictional engagement means for setting a predetermined speed are executed, in case the number of revolutions of any rotary member grows large, and its frequency is not excessively increased, to improve the durability of the frictional engagement means while preventing an abnormal increase in the numbers of revolutions of the rotary members. As a result, the bearings or the like are given excellent durabilties, and the number of the frictional engagement means for changing the engagement/disengagement patterns for the speed change can be suppressed to maintain the speed change controllability excellent.

As could be known from the individual embodiments thus far described, the engagement/disengagement patterns to be selected for setting a predetermined speed are different depending upon either the speed immediately before said predetermined speed is set or the speed to be reached from said predetermined speed. Thus, the engagement/disengagement pattern for the speed to be changed from any speed may preferably be selected while considering another speed to be achieved as a result of a speed change anticipated to be executed next. This is exemplified by a case in which the speed change is executed continuously and promptly from the first to third speeds, as will be specifically described in the following.

In the automatic transmission equipped with the gear train shown in FIG. 1, the forward first speed is set by engaging at least three of the four frictional engagement means of the fourth and fifth clutch means K4 and K5 and the first and second brake means B1 and B2 in addition to the first clutch means K1. If, on the other hand, the second speed is set according to the patterns of the column a of FIG. 2, not only the first clutch means K1 but also either at least three of the five frictional engagement means of the second clutch means K2, the fifth clutch means K5, the first brake means B1, the second brake means B2 and the fourth brake means B4 or the first brake means B1 and the fourth brake means B4 are engaged. Therefore, the speed change between the first and second speeds can be achieved by changing the engagement/disengagement states of the two frictional engagement means like the speed change, in which the second speed is set according to the pattern ① of the column a of FIG. 2, by setting the first speed according to the pattern ① of FIG. 2, and by engaging the second clutch means K2 in that state while disengaging the fourth clutch means K4. Even in case the second speed is to be set according to the pattern of the column b of FIG. 2, the patterns of the column b are those for engaging not only the first clutch means K1 but also either the three frictional engagement means of the fourth clutch means K4, the first brake means B1 and the third brake means B3 or the two frictional engagement means of the first brake means B1 and the fourth brake means B4. Thus, for example, if the first speed is set according to the pattern ③ and if the second brake means B2 is disengaged in that state while the third brake means B3 is engaged, the second speed is set according to the pattern ① of the column b. Like this, the speed changes can be executed without any of the so-called simultaneous (or multiple) speed change, in which the number of the frictional engagement means for changing the engagement/disengagement states is three or more. Specifically, the speed change between the first and second speeds can be executed without the simultaneous speed change according to no matter which of the pattern of the column a or b the second speed might be set. In other words, either of the pattern of the column a or b can be adopted as the engagement-/disengagement pattern of the frictional engagement means for setting the second speed.

On the other hand, the speed change between the second and third speeds will be examined in the following. This speed change can be executed without any simultaneous speed change even in case the third speed is to be set according to any of the patterns of the columns a, b, c and d. As could be seen from FIG. 3, however, the fluctuating number of revolutions of any of the rotary members will exceed the value "1" in cases other than those, in which the second speed is to be set according to the pattern of the columns a whereas the third speed is to be set according to the patterns of the column a, and in which the third speed is to be set according to the patterns of the column b whereas the third speed is to be set according to the pattern of the column b or c. For the speed change between the second and third speeds, therefore, it is practical that the third speed is set according to the patterns of the column a in case the second speed is set according to the patterns of the column a, and that the third speed is set according to the pattern of the column b or c in case the second speed is set according to the patterns of the column b.

Thus, the engagement/disengagement patterns to be practically adopted at the time of the stepwise speed changes from the first to third speeds are expressed, as follows, if the symbols appearing in FIG. 2 are used:

1st-2nd: a-3rd: a
1st-2nd: b-3rd: b
1st-2nd: b-3rd: c
1st-2nd: a-2nd: b-3rd: c.

Here, the speed changing procedures, as enumerated on the fourth line, implies that the engagement/disengagement patterns are changed in the state of the second speed.

Here will be examined the fluctuating numbers of revolutions of the rotary members in the aforementioned four kinds of speed changing procedures. What takes the largest fluctuating number of revolutions at the speed change (i.e., 1st-2nd: a) between the first and second speeds in case of setting the second speed according to the patterns of the column a is the sun gear 2S of the second planetary gear set 2, as could be seen from FIG. 3, and the largest value is "0.43". In case the second speed is set according to the pattern of the column b (i.e., 1st-2nd: b), on the other hand, the fluctuating number of revolutions of the sun gear 2S of the second planetary gear set 2 is "0.78" because the number of revolutions of the same changes from "−0.78" to "0.00". As a result, the so-called "simultaneous speed change" is not caused, no matter which of the patterns of the column a or b the second speed might be set, in connection with the speed change between the first and second speeds. From the standpoint of the fluctuating number of revolutions only, however, it could be said that the second speed be set according to the patterns of the column a.

In case of the speed change between the second and third speeds, on the contrary, the second speed is set according to the patterns of the column a whereas the third speed is set according to the patterns of the column a (i.e., 2nd: a-3rd: a). Then, the fluctuating number of revolutions of the sun gear 2S of the second planetary gear set 2 takes the largest value of "0.55". If, moreover, the second speed and the third speed are set according to the patterns of their respective columns b (i.e., 2nd: b-3rd: b), no change occurs in the number of revolutions of the sun gear 2S of the second planetary gear set 2. If, still moreover, the second speed is set according to the patterns of the column b whereas the third speed is set according to the pattern of the column c (i.e., 2nd: b-3rd: c), the fluctuating number of revolutions of the sun gear 2S of the second planetary gear set 2 is "1.00". In case, on the other hand, the second speed is changed to the pattern of the column b after it has been set according to the pattern of the column a whereas the third speed is then set according to the pattern of the column c (2nd: a-2nd: b-3rd: c), the number of revolutions of the sun gear 2S of the second planetary gear set 2 is changed from "−1.21" to "0.00" and then to "1.00" so that the overall fluctuating number of revolutions is "2.21". In connection with the speed change between the second and third speeds, the speed change, in which the second speed is set according to the patterns of the column a whereas the third speed is set according to the pattern of the column b, is preferable because the fluctuating number of revolutions of the sun gear 2S of the second planetary gear set 2 is decreased.

In case of the stepwise speed change from the first to third speeds, therefore, the aforementioned four kinds of speed changing procedures are preferable from the standpoint of the speed change controllability. If the following second one of those speed changing procedures is taken:

1st-2nd: b-3rd: b, the fluctuating number of revolutions of the sun gear 2S of the second planetary gear set 2 at the time of the speed change between the first and second speeds is "0.78" whereas the fluctuating number of revolutions between the second and third speeds is "0.00", and their sum is "0.78", which is not exceeded by anything. According to another speed changing procedure, on the contrary, the fluctuating number of revolutions becomes larger. More specifically: the total fluctuating number of revolutions of the sun gear S2 of the second planetary gear set 2 is "0.98" in case of the aforementioned first speed changing procedure (i.e., 1st-2nd: a-3rd: a); the total fluctuating number of revolutions of the sun gear 2S of the second planetary gear set 2 is "1.78" in case of the third speed changing procedure (i.e., 1st-2nd: b-3rd: c); and the total fluctuating number of revolutions of the sun gear S2 of the second planetary gear set 2 is "2.64" in case of the fourth speed changing procedure (i.e., 1st-2nd: a-2nd: b-3rd: c).

In case a speed is changed from a predetermined speed to another speed, as described above, the engagement/disengagement patterns are selected for the setting with reference to both the speed change controllability only between those two speeds and the fluctuating number of revolutions of any rotary members. Then, the overall fluctuating number of revolutions of any rotary member may increase in case of the speed change from said another speed to still another speed. In the automatic transmission having the structure thus far described, therefore, the sum of the fluctuating number of revolutions is decreased in case of setting the second speed such as the case of the speed change not only from the first to second speeds but also from the second to third speeds, and the second speed is set by selecting the engagement/disengagement pattern free from the simultaneous speed change. These controls are executed by engaging or disengaging the aforementioned individual frictional engagement means suitably with the use of the aforementioned electronic control unit E and oil pressure control system C.

Incidentally, the description thus far made is directed to the case of the speed changes from the first to third speeds. In case of the speed changes from the second to fourth speeds, like the aforementioned case, the engagement/disengagement patterns of the frictional engagement means are selected for the settings on the basis of the sum of the fluctuating number of revolutions of a predetermined rotary member and the number of the frictional engagement means to be interchanged for operations. In case of the so-called "skip speed change" to a speed spaced apart by two or more steps as well as the speed changes between the adjacent speeds, too, the engagement/disengagement patterns of the frictional engagement means are selected for the settings on the basis of the sum of the number of revolutions of a predetermined rotary member and the number of the frictional engagement means to be interchanged for operations. These speed change controls are used for predicting the speed to be set to. The predictions of the speed to be set to later can be executed either with the data, which are statistically obtained from the speed change patterns being followed at present by the automatic transmission, or by the so-called "study control", in which the speed change pattern is determined by storing and analyzing the speeds being set one by one during the run of the vehicle.

In the automatic transmission equipped with the gear train shown in FIG. 1, the various engagement/disengagement patterns of the frictional engagement means can be selected, as could be seen from FIG. 2, but the numbers of revolutions of the rotary members are individually different for the engagement/disengagement patterns, as could be seen from FIG. 3. Therefore, the automatic transmission of the present invention is constructed to minimize the rotational fluctuations of the rotary members in accordance with the speed changes and to suppress the unnecessary rotations of the rotary members. In the embodiment shown in FIG. 1, the electronic control unit E and the oil pressure control system C are constructed to select the engagement/disengagement patterns of the frictional engagement means in the following manners thereby to set the individual speeds.

The frictional engagement means to be disengaged for an upshift are the clutch means and the brake means other than the third clutch means K3, as could be seen from FIG. 2. The speeds to be achieved by disengaging those frictional engagement means and the engagement/disengagement patterns of the frictional engagement means at that time are tabulated in FIG. 9. Here, in the lefthand column of FIG. 9, the speed change patterns are designated at numerals, and the expressions such as "2a" or "2b" indicate the patterns for setting the speeds of FIG. 2 with their numerals and the engagement/disengagement patterns of the corresponding columns of FIG. 2 at the speeds with their small alphabetical letters.

Thus, the speed change from the first to second speeds, for example, can be effected by using any of the fourth clutch means K4, the fifth clutch means K5 and the second brake means B2 as an element to be disengaged. If, in this case, the fourth clutch K4 is to be disengaged, the second speed is set according to the patterns of the column a of FIG. 2. If, on the other hand, the fifth clutch means K5 or the second brake means B2 is to be disengaged, the second speed is set according to the pattern of the column b of FIG. 2. Likewise, both the frictional engagement means to be disengaged for the speed changes between the adjacent speeds and the engagement/disengagement patterns of the individual speeds to be set to by disengaging the frictional engagement means are known from FIG. 9. Moreover, the specific engagement/disengagment states of the frictional engagement means and the rotating states of the rotary members of the individual planetary gear sets 1, 2 and 3 can be known from FIGS. 2 and 3.

The examples of changes of the engagement/disengagement patterns for the speed changes, as tabulated in FIG. 9, are three kinds for the 1st-2nd speed changes, six kinds for the 2nd-3rd speed changes, six kinds for the 3rd-4th speed changes, and three kinds for the 4th-5th speed changes. Therefore, the combination of the patterns to be selected for the speed changes from the first to fifth speeds are totally 162 kinds, some of which may experience the so-called "simultaneous speed change" in which the engagement/disengagement states of three or more frictional engagement means are simultaneously changed for executing the speed changes. Thus, all of the pattern combinations are not suited for the practical purposes. For example: the 1st-2nd speed change can be executed (i.e., the change in the pattern of 1-2a) by selecting the fourth clutch means K4 as the means to be disengaged; the 2nd-3rd speed change can be executed (i.e., the change in the pattern of 2b-3b) by selecting the fourth clutch means K4 likewise as the means to be disengaged; the 3rd-4th speed change can be executed (i.e., the change in the patterns of 3a-4a, 3c-4a or 3d-4a) by selecting the first brake means B1 as the means to be disengaged; and the 4th-5th speed change can be executed by selecting the fourth clutch means K4 as the means to be disengaged. In this case, the pattern for setting the second speed is changed from the pattern 2a to the pattern 2b for changing the speed to 3rd before the third speed is set, and the pattern for setting the third speed is changed from the pattern 3b to another pattern (3a, 3c or 3d) for changing the speed to fourth before the fourth speed is set. Otherwise, the so-called "simultaneous speed change" would occur. Since the change in the pattern prior to such speed change is followed by the fluctuations of the number of revolutions of the rotary members of the planetary gear sets, a selection is made to change the revolutions of the rotary members of the planetary gear set, which do not directly participate in the torque transmission at the speed under consideration.

Of the aforementioned 162 combinations of the patterns for setting the major speeds stepwise from the first to fifth speeds, on the other hand, there are 53 kinds of combinations which require no change in the patterns accompanied by the fluctuations of the revolutions of the rotary members prior to the speed change. For example, the individual speeds are set by changing the engagement/disengagement patterns as 1-2a-3a-4a-5a, for example, to set the speeds one by one from the first to fifth speeds. Of these combinations, there is nothing but has two or less kinds of the frictional engagement means to be disengaged.

As to the combinations of the patterns which would cause no fluctuation in the numbers of revolutions of the rotary members while each of those speeds is being set, the numbers of revolutions of the rotary members of the individual planetary gear sets will be examined. As could be apparent from FIG. 3, the individual patterns, e.g., the patterns (2a) of the column a of the second speed, the patterns (3a) of the column a of the third speed, the pattern (3d) of the column d of the third speed, the pattern (4b) of the column b of the fourth speed, the pattern (5b) of the column b of the fifth speed and the pattern (5c) of the column c of the fifth speed have higher numbers of revolutions than those of the other patterns of the individual speeds, and are eliminated from the patterns to be selected, so as to avoid any unnecessary rotation. In these unnecessary engagement-/disengagement patterns are eliminated from FIG. 9, the following chart is obtained:

1st-2nd Speed Change
  Change of 1-2b: Disengagement of K5
  Change of 1-2b: Disengagement of B2
2nd-3rd Speed Change
  Change of 2b-3b: Disengagement of K4
  Change of 2b-3c: Disengagement of B3
  Change of 2-3: Disengagement of B4
3rd-4th Speed Change
  Change of 3c-4a: Disengagement of B1
4th-5th Speed Change
  Change of 4a-5a: Disengagement of K1
  Change of 4-5: Disengagement of K4

Of the aforementioned engagement/disengagement patterns, the 3rd-4th speed change is achieved by the change of 3c-4a so that the third speed is set according to the pattern 3c. If, therefore, the numbers of revolutions of the rotary members at the individual speeds are unchanged, there is eliminated the change (of 2b-3b) for setting the third speed according to the pattern 3b, i.e., the speed change using the fourth clutch means K4 to be disengaged. Then, the pattern of the column b of the third speed is not selected.

If the pattern is changed from 2b to 3c, as could be seen from FIG. 3, the number of revolutions of the sun gear 2S of the second planetary gear set 2 is increased from its stop state to 1.00 so that its change is the value "1.00". Simultaneously with this, the number of revolutions of the carrier 2C is changed from 0.35 to 0.79 so that its change is the value "0.44". In case, however, the pattern is changed from 2b to 3c, the number of revolutions of the sun gear 2S is not changed, but the change in the number of revolutions of the carrier 2C is the value "0.16". In order to decrease the rotational fluctuations accompanying the speed change, therefore, it is preferable to select the pattern of the column b of the third speed. According to the method of the present invention, therefore, the speed change from second to third speeds is executed by using the fourth clutch means K4 as the frictional engagement means to be disengaged and by using the change of 2b-3b. After this, the speed change to the fourth speed is executed in a state to decrease the rotational fluctuations of the rotary member either by making the change to the pattern of the column c in the state of the third speed or by making the change to the pattern of the column c prior to the change to the fourth speed. If, moreover, the speed change from the second to third speeds is executed in the manner, as described above, the fourth clutch means K4 can be used as the means to be disengaged. Since, in addition, the speed change from the fourth to fifth speeds can be executed by using the fourth clutch means K4 as the means to be disengaged, the number of the elements to be controlled for the speed change can be decreased to simplify the control mechanism and method.

Several embodiments of the chart according to the method of the present invention, in which the numbers of revolutions of the rotary members and the rotational fluctuations at the time of a speed change are suppressed by changing the engagement/disengagement patterns prior to the speed change, are tabulated in FIGS. 10 to 25. In these charts exemplifying the forward five speeds: double circles ⊚ indicate that the corresponding means may be disengaged but may preferably be engaged at the time of the speed change; triangles Δ indicate that the corresponding means may be engaged but may preferably be disengaged at the time of the speed change; and solid circles ● indicate that the corresponding means are to be disengaged at the time of an upshift.

In the speed control method to be applied to the automatic transmission shown in FIG. 1, as could be apparent from FIGS. 10 to 25, the engagement/disengagement pattern at the forward third speed is changed from the pattern of the column b to the pattern of the column c. As a result, the rotational fluctuations of the rotary members at the time of the speed changes from the second to third speeds and from the third to fourth speeds are decreased to invite an advantage for reducing the shifting shocks. While the forward third speed is being set, the numbers of revolutions of the rotary members are changed as the engagement/disengagement patterns are changed. Since, however, the gear ratio to be set by the automatic transmission as a whole is not changed, few shocks are physically felt by the driver.

Incidentally, a speed change from the second speed through the third speed to the fourth speed could be executed with few rotational fluctuations if the aforementioned procedure (i.e., the pattern 2b→ the pattern 3b→the pattern 3c→the pattern 4a) is followed. Unless through the pattern 3b, the speed change can be effected without the so-called "simultaneous speed change" in which the engagement/disengagement states of three or more frictional engagement means have to be simultaneously changed for the speed change. In this case, the speed change may be executed on the basis of the charts which are prepared by eliminating the pattern 3b from the individual charts of FIGS. 10 to 25. In this case, moreover, the frictional engagement means to be disengaged for the speed change from the second to third speeds are different from those enumerated in the aforementioned individual charts.

In FIG. 26, there will be presented a chart which is more specified for the automatic transmission shown in FIG. 1. In FIG. 26 and subsequent charts; symbols ✕ indicate that the corresponding means are engaged at the time of braking on the engine.

As could be apparent from FIG. 26, the speed change from the first to second speeds is achieved (i.e., the change from the pattern of 1 to the pattern of 2a) as a result that the one-way clutch 20 of the fourth clutch means K4 is automatically disengaged in accordance with the engagement of the fourth brake means B4. On the other hand, the speed change from the second to third speeds is achieved (i.e., the change from the pattern of 2b to the pattern of 3b) as a result the one-way clutch 20 of the fourth clutch means K4 is automatically disengaged in accordance with the engagement of the third clutch means K3. Moreover, the speed change from the third to fourth speeds is achieved (i.e., the change from the pattern of 3c to the pattern of 4a) as a result that the one-way clutch 40 of the first brake means B1 is automatically disengaged in accordance with the engagement of the fifth clutch means K5. Still moreover, the speed change from the fourth to fifth speeds is achieved (i.e., the change from the pattern of 4a to the pattern of 5a) as a result that the one-way clutch 20 of the fourth clutch means K4 is automatically disengaged in accordance with the engagement of the third brake means B3.

In case, therefore, the speed changes according to the chart of FIG. 26 are executed for the automatic transmission shown in FIG. 1, an advantage is obtained for improving the shifting shocks because the rotational fluctuations of the rotary member (e.g., the sun gear 2S of the second planetary gear set 2) at the time of the speed change between the speeds higher and lower the second and third speeds are decreased by changing the engagement/disengagement patterns in the states of the second and third speeds. Moreover, the numbers of revolutions of the rotary members of the automatic transmission shown in FIG. 1 are tabulated in FIG. 3 so that the unnecessary rotations (e.g., the ordinary increase in the number of revolutions of the carrier 2C of the second planetary gear set 2) at the second and third speeds can be prevented to decrease the relative numbers of revolutions to the numbers of other members accordingly. By executing the speed change controls according to FIG. 26, still moreover, the speed changes of the major five speeds in the forward direction can be executed by disengaging the two frictional engagement means, i.e., the fourth clutch means K4 and the first brake means B1. Thus, accumulators of the oil pressure control system can have their number decreased by using the one-way clutches to decrease the size of the control system and to facilitate the speed change controls.

In the automatic transmission having several kinds of engagement/disengagement patterns, the fluctuating number of revolutions of any rotary member is enlarged if the engagement/disengagement patterns for avoiding the simultaneous speed change are selected. If, on the contrary, the engagement/disengagement patterns for diminishing the fluctuating number of revolutions are selected, the simultaneous speed change may not be avoided. In this case, a speed change through another speed is executed to avoid the simultaneous speed change and diminish the fluctuating number of revolutions. If these speed change controls are executed at all times, the frequency for changing the frictional engagement means is increased to complicate the controls accordingly. In the automatic transmission according to the present invention, therefore, the control system executes the following speed change controls to improve the durability and reduce the shifting shocks. In connection with the embodiment shown in FIG. 1, more specifically, the control system constructed of the oil pressure control system C and the electronic control unit E sets a speed having several kinds of engagement/disengagement patterns by selecting an engagement/disengagement pattern according to the following conditions for the speed change.

Figure 27:
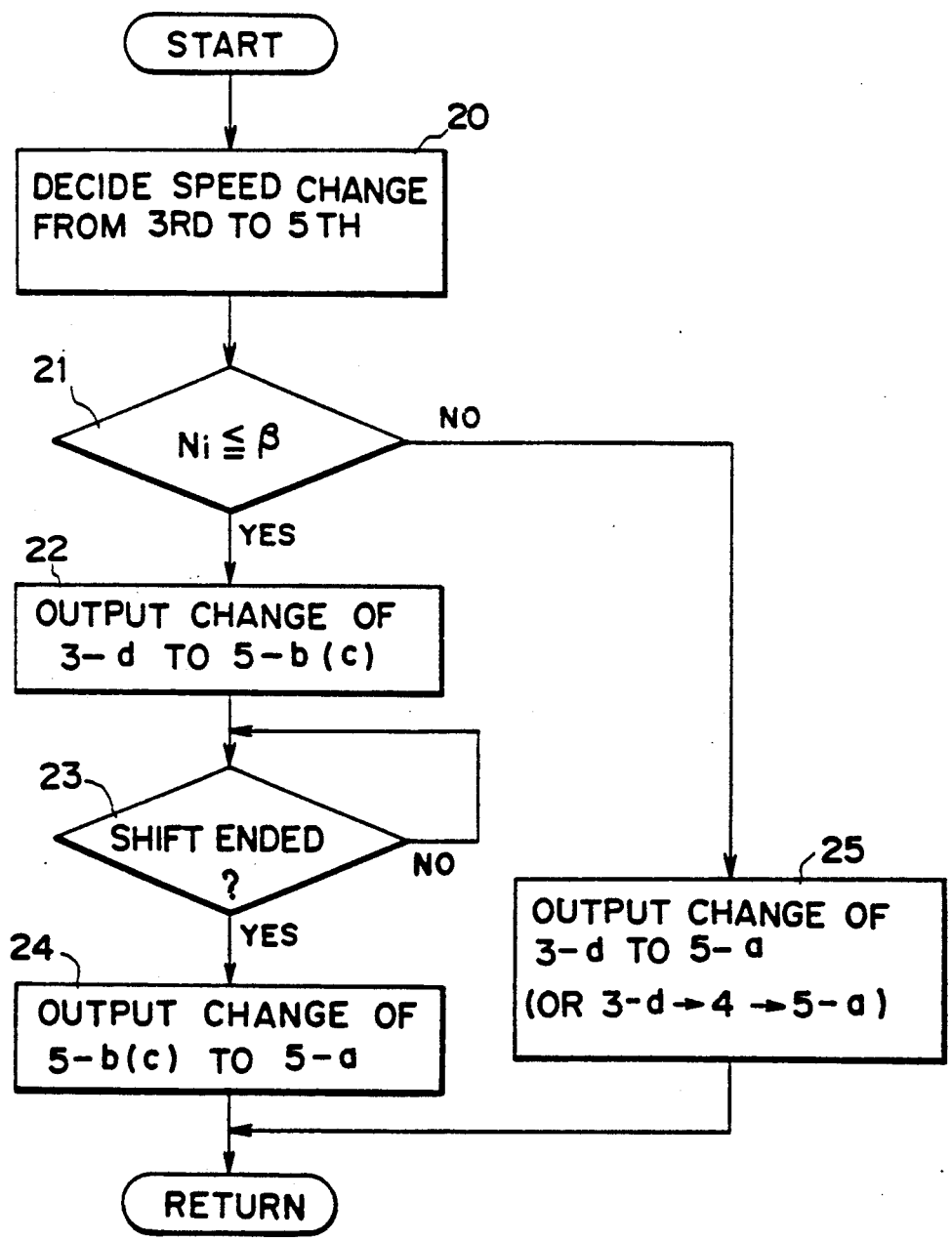
FIG. 27 is a flow chart for explaining still another method of the present invention.

If an increase in the running speed and a drop in the throttle opening take place while the automobile is running at the third speed, the speed change to the fifth speed is decided according to those parameters. In this case, there are three kinds of engagement/disengagement patterns to be selected, as shown in FIGS. 2 and 3. As a reference for selecting the engagement/disengagement patterns to set the fifth speed, the automatic transmission shown in FIG. 1 adopts the number of revolutions of a predetermined rotary member such as the input shaft 4 so that the engagement/disengagement patterns to be selected are different depending upon the magnitude of the number of revolutions. In FIG. 27, more specifically, the speed changed to the fifth speed is decided (at Step 20) while the automobile is running at the third speed which is set according to the pattern of the column d of FIG. 2. Then, it is decided (at Step 21) whether or not the number Ni of revolutions of the input shaft 4 is below a predetermined value $\beta$. This reference value $\beta$ is one determined by considering the durability of the rotary members of the gear set and may be either a constant or a variable varied according the conditions such as the oil temperature. If the decision result of Step 21 is "YES", the procedure advances to Step 22, at which a change of the engagement/disengagement pattern is outputted from the pattern of the column d setting the third speed to the pattern of the column b or c of FIG. 2 as the engagement/disengagement pattern for setting the fifth speed. If the decision result of Step 21 is "YES", then it is decided that the numbers of revolutions of the rotary members of the gear train will not exert influences upon the durability. At the same time, the engagement/disengagement pattern outputted in this case is one in which the simultaneous speed change is not caused but in which the number of revolutions of the ring gear 1R of the first planetary gear set 1 or the sun gear 3S of the third planetary gear set 3 is two times as high as that of the input shaft 4. More specifically, the pattern of the column d of the third speed is one capable of engaging the first to third clutch means K1 to K3 and the first brake means B1 whereas the pattern of the column c of the fifth speed is one for causing the first to third clutch means K1 to K3 and the third brake means B3. Thus, this speed change can be executed by executing the disengagement of the first brake means B1 and the engagement of the third brake means B3 in parallel. In case, on the other hand, the fifth speed is to be set according to the pattern of the column c, this pattern is capable of engaging the second clutch means K2, the third clutch means K3, the first brake means B1 and the third brake means B3, so that the speed change from the third speed can be executed by disengaging the first clutch means K1 and engaging the third brake means B3. Thus, in either case, the speed change can be executed by changing the engagement/disengagement states of the two frictional engagement means. In other words, the simultaneous speed change is not caused so that the controls for the speed change can be facilitated. In this case, moreover, the numbers of revolutions of the ring gear 1R of the first planetary gear set 1 and the sun gear 3S of the third planetary gear set 3 exceed two times of that of the input shaft 4, as could be seen from FIG. 3, so that their fluctuating number of revolutions become large. Since, however, the number of revolutions of the input shaft 4 is small, the real numbers of revolutions or the real fluctuating numbers of revolutions of the ring gear 1R and the run gear 3S do not grow so large as to exert influences upon the durability so that no serious shock is generated.

After the pattern for the aforementioned speed change has been outputted at Step 22, it is decided at subsequent Step 23 whether or not the speed change to the fifth speed has been ended. At the end of this speed change, i.e., at the instant when the decision result of Step 23 is "YES", an output is made (at Step 24) to change the pattern for setting the fifth speed from the pattern of the column b or c to the pattern of the column a. Then, the procedure is returned. As a result, the numbers of revolutions of the individual rotary members in the state of the fifth speed are so decreased as to take a better advantage for improving the durability and to prevent any rise in the oil temperature.

In case, on the other hand, the decision result of Step 21 is "NO", a speed change is executed for setting the fifth speed according to the pattern of the column a. Specifically, if the decision result of Step 21 is "NO", the input shaft 4 has a large number of revolutions. In this case, therefore, the procedure advances to Step 25, at which an output is made to set the fifth speed according to the pattern of the column a. This pattern of the column a of the fifth speed is 1.83 times as large as the number of revolutions of the input shaft 4, as could be seen from FIG. 3, even if the numbers of revolutions of the individual rotary members take their maximums. Even if the numbers of revolutions of the rotary members of the gear set are increased according to the large real number of revolutions of the input shaft 4, the fluctuating numbers of revolutions of the rotary members will become so large as neither to deteriorate the shifting shocks nor to affect the durability adversely. Here, this pattern of the column a of the fifth speed is one for engaging the second clutch means K2, the third clutch means K3 and the third brake means B3. In case, therefore, a direct speed change is to be made from the pattern of the column d of the third spped, the first clutch means K1 and the first brake means B1 are disengaged whereas the third brake means B3 is engaged. Thus, the number of the frictional engagement means for changing the engagement/disengagement states is three or more so that the so-called "simultaneous speed change" is caused. In order to avoid this, it is sufficient to execute the speed change controls, in which the fifth speed is set according to the pattern of the column a once the fourth speed was set.

The scanning procedure is returned after the aforementioned output has been made at Step 25.

In the automatic transmission shown in FIG. 1, therefore, the engagement/disengagement patterns for setting the speeds are changed according to the magnitudes of the number of revolutions of the input shaft 4. As a result, the necessity for executing the speed changes passing the so-called "simultaneous speed change" or an intermediate speed can always be eliminated to facilitate the speed change controls.

Here will be presented an example of the gear train which can be incorporated into the automatic transmission of the present invention.

Figure 28:
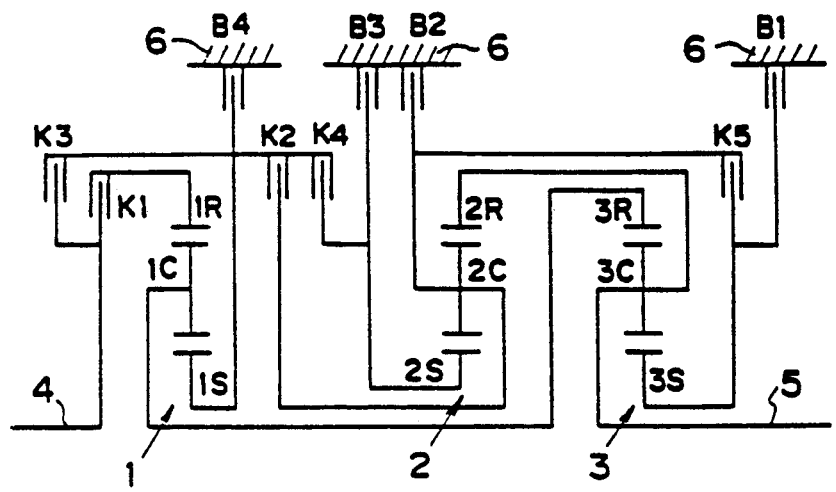

The gear train shown in FIG. 28 is modified from the gear train shown in FIG. 1 such that the fourth clutch means K4 is replaced by a single multiple disc clutch and such that the first brake means B1, the third brake means B3 and the fourth brake means B4 are replaced by multiple disc brakes, respectively.

Figure 29:
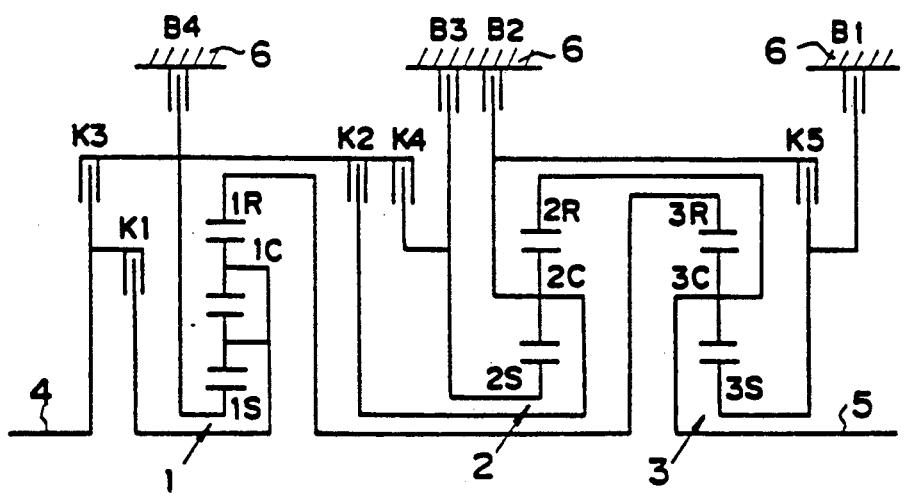

An embodiment shown in FIG. 29 is modified from the gear train shown in FIG. 28 by replacing the first planetary gear set 1 by a double pinion type planetary gear set and by accordingly connecting the ring gear 1R to the ring 3R of the third planetary gear set 3 and the carrier 1C through the first clutch means 1 to the input shaft 4.

Figure 30:
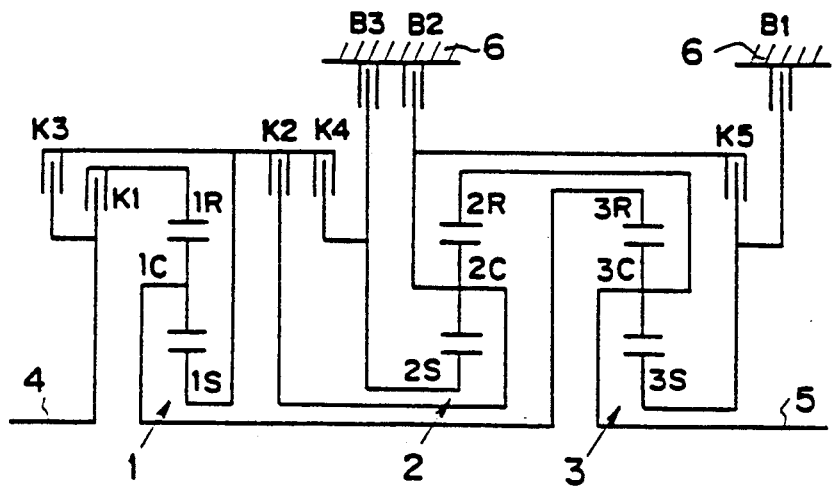
Figure 31:
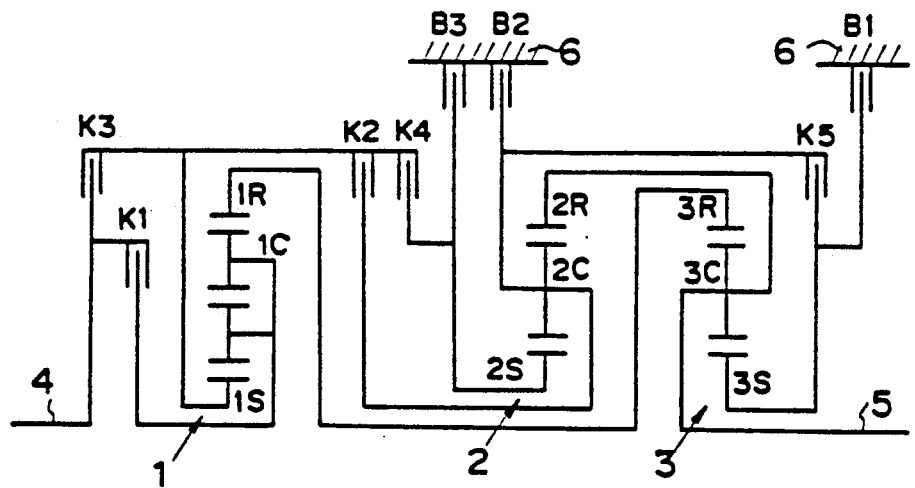

An embodiment shown in FIG. 30 is made by omitting the fourth brake means B4 from the aforementioned structure shown in FIG. 28, and an embodiment shown in FIG. 31 is made by omitting the fourth brake means B4 from the aforementioned structure shown in FIG. 29. In case, therefore, the speed controls are to be executed for the automatic transmissions having those structures shown in FIGS. 30 and 31, they may be executed in accordance with those of the charts of FIGS. 10 to 25, in which the fourth brake means B4 need not be engaged.

In an embodiment shown in FIG. 32, the fourth brake means B4 is eliminated from the aforementioned structur shown in FIG. 1, and the fifth clutch means K5 is composed of a one-way clutch 50 and a multiple disc clutch 51, which are arranged in parallel with each other. The remaining structure is left similar to that of FIG. 1. The chart of the embodiment of FIG. 32 for setting the major five forward speeds is presented in FIG. 33.

In an embodiment shown in FIG. 34, the fourth brake means B4 is eliminated from the aforementioned structure shown in FIG. 1, and the second brake means B2 is composed of a one-way clutch 60, which is interposed between the carrier 2C of the second planetary gear set 2 and the casing 6, and a multiple disc brake 61 arranged in parallel with the one-way clutch 60. The remaining structure is left similar to that of FIG. 1. The chart of the embodiment of FIG. 34 for setting major five foward speeds is presented in FIG. 35.

Figures 35, 36:
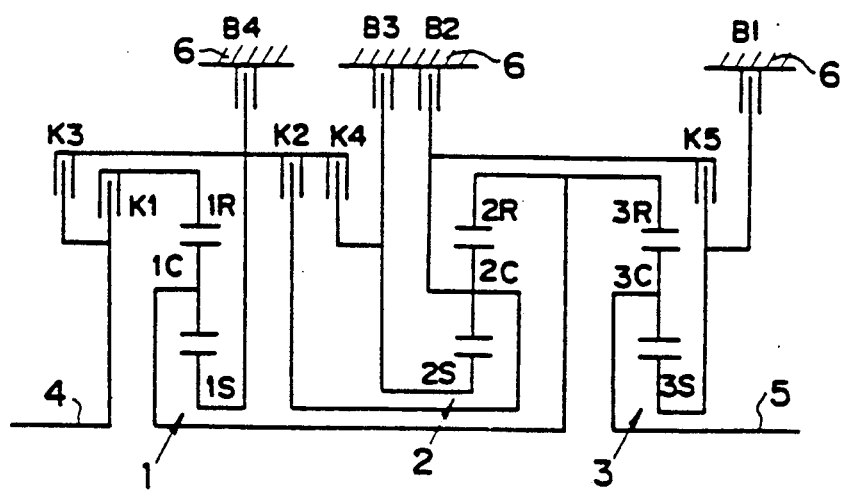

In an embodiment shown in FIG. 36, the ring gear 2R of the second planetary gear set 2 of the aforementioned structure shown in FIG. 28 is connected to not the carrier 3C of the third planetary gear set 3 but the ring gear 3R of the third planetary gear set 3, and the carrier 1C of the first planetary gear set 1 is accordingly connected to the ring gears 2R and 3R of the second planetary gear set 2 and the third planetary gear set 3. The remaining structure is left similar to that of FIG. 28.

Figure 37:
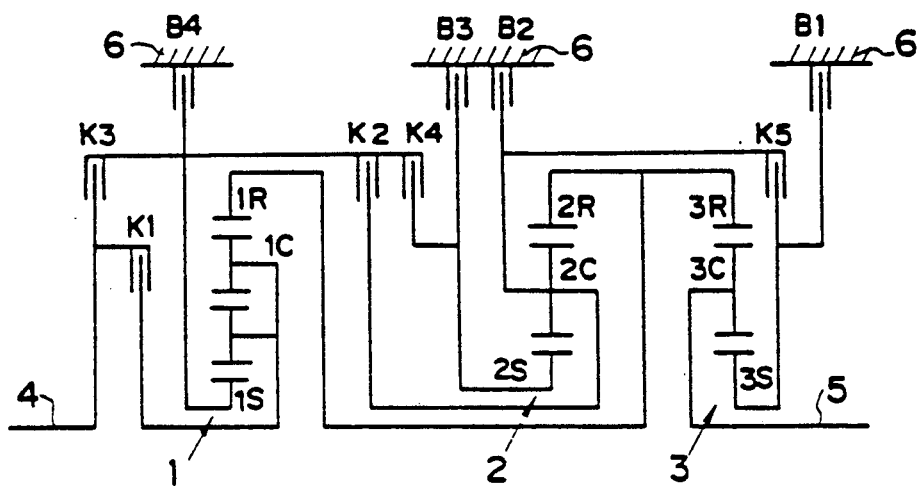

In an embodiment shown in FIG. 37, on the other hand, the first planetary gear set 1 of the aforementioned structure shown in FIG. 36 is changed into a double pinion type planetary gear set. Accordingly, the ring gear 1R of the first planetary gear set 1 is connected to the ring gears 2R and 3R of the second planetary gear set 2 and the third planetary gear set 3, and the carrier 1C of the first planetary gear set 1 is selectively connected through the first clutch means K1 to the input shaft 4. The remaining structure is left similar to that shown in FIG. 36.

Figure 38:
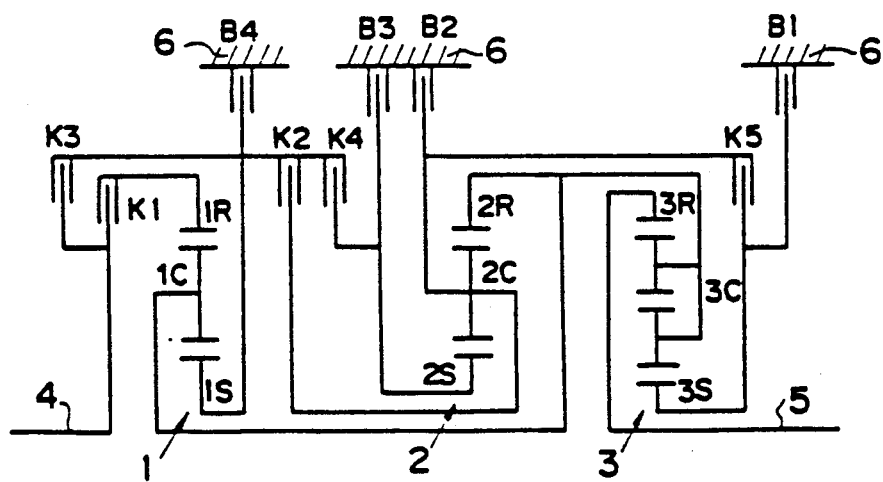

In an embodiment shown in FIG. 38, the third planetary gear set 3 of the structure shown in FIG. 36 is changed into a double pinion type planetary gear set. Accordingly, the carrier 3C of the third planteray gear set 3 is connected to the ring gear 2R of the second planetary gear set 2, and the output shaft 5 is connected to the ring gear 3R of the third planetary gear set 3. The remaining structure is left similar to that shown in FIG. 36.

Figure 39:
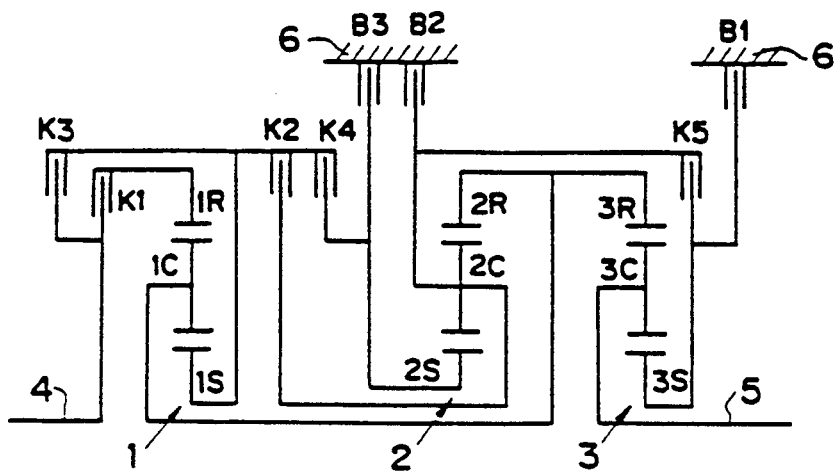
Figure 40:
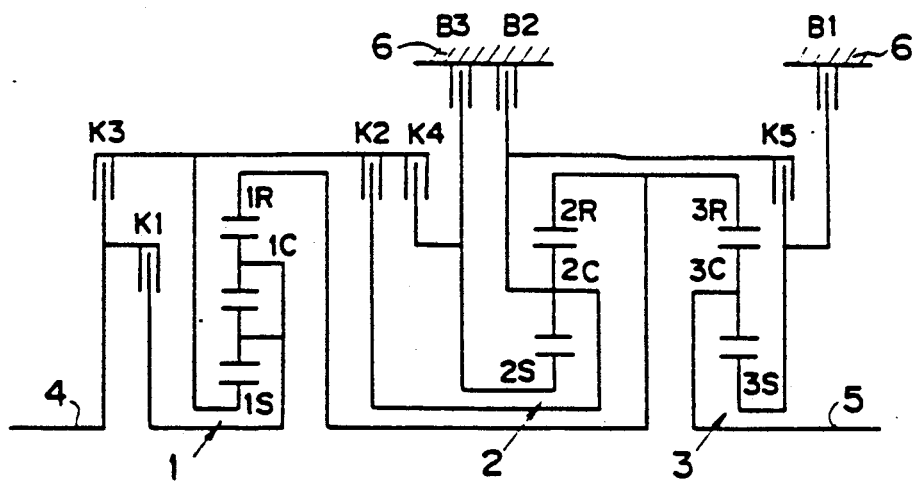
Figures 41, 44:
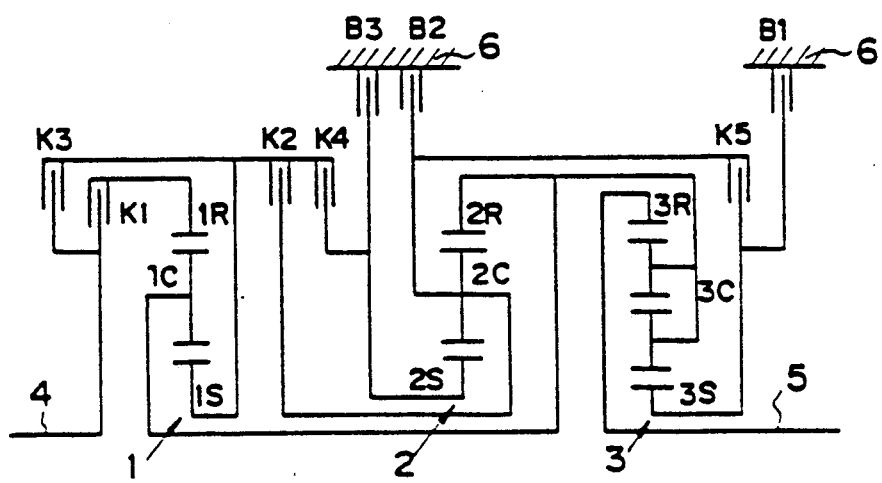

In an embodiment shown in FIG. 39, moreover, the fourth brake means B4 is eliminated from the structure shown in FIG. 36. Likewise, an embodiment shown in FIG. 40 is modified by eliminating the fourth brake means B4 from the structure shown in FIG. 37, and an embodiment shown in FIG. 41 is modified by eliminating the fourth brake means B4 from the structure shown in FIG. 38.

In the automatic transmissions having those structures shown in FIGS. 36 to 41, the speeds tabulated in FIG. 42 and the engagement/disengagement patterns for the frictional engagement means to set the individual speeds can be achieved, and the number of revolutions the rotary members of the individual planetary gear sets 1, 2 and 3 are tabulated in FIG. 43 in case the input number of revolutions is set at "1". Incidentally, the numbers of revolutions, as tabulated in FIG. 43, are values: for the individual gear ratios of the planetary gear sets 1, 2 and 3 at ρ1=0.450, ρ2=0.569 and ρ3=0.405 in case the planetary gear sets 1, 2 and 3 are the single pinion type planetary gear sets; for the gear ratio of the first planetary gear set 1 at ρ1=0.310 in case the set 1 is of the double pinion type; and for the gear ratio of the third planetary gear set 3 at ρ3=0.288 in case the set 3 is of the double pinion type.

In case the method of the present invention is to be executed for the automatic transmissions having the aforementioned structures shown in FIGS. 36 to 41, the speed changes are executed by changing the five forward major speeds into (the pattern of 1)→(the pattern of 2b)→the pattern of 3b→the pattern of 3c)→(the pattern of 4)→(the pattern of 5) for a reason like that which has been described in connection with the speed change controls of the case for the aforementioned automatic transmission shown in FIG. 1. These speed changes are exemplified in the form of charts in FIGS. 44 to 59. Incidentally, the speed change controls for the automatic transmission failing to have the fourth brake means B4 are executed on the basis of the charts in which the fourth brake means B4 is not engaged.

The numbers of revolutions of the individual rotary members in case of the aforementioned speed changes could be seen from FIG. 43. Especially as to the third of the speeds, the speed change from the second speed is executed according to the pattern 3b. As a result, no fluctuation occurs in the number of revolutions of the sun gear 2S of the second planetary gear set 2, and the number of revolutions of the carrier 2C of the same is increased from "0.44" to "0.51". In order to set the third speed according to the pattern of 3c prior to the speed change to the fourth speed, moreover, the number of revolutions of the sun gear 2S is then increased to "1.00", and the number of revolutions of the carrier 2C is also increased to "1.00". As a result of the aforementioned speed changes, there are suppressed both the unnecessary rotations of the rotary members of the second planetary gear set 2 and the rotational fluctuations for the speed changes. As a result, the advance of the wear can be suppressed to improve the durability and reduce the shifting shocks.

On the other hand, those structures shown in FIGS. 36 to 41 can also be improved to use the frictional engagement means having one-way characteristics. This improvement is illustratively exemplified in FIGS. 60 to 62.

Figures 60, 61:
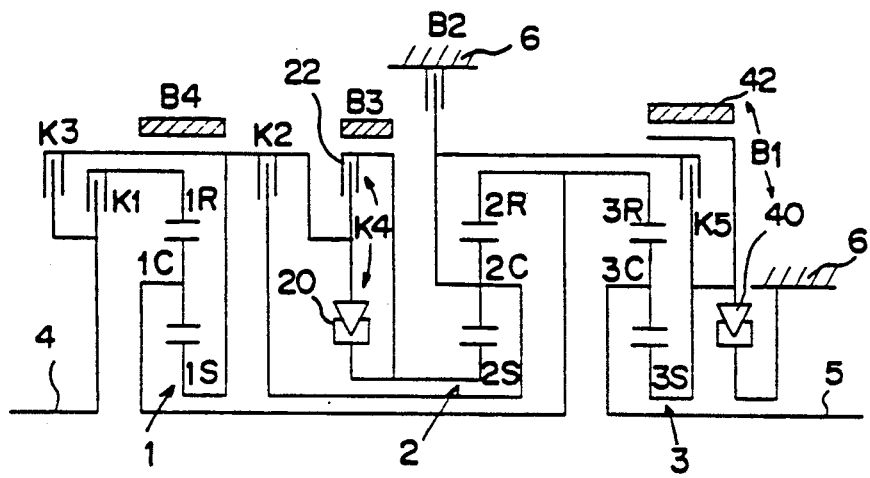
FIG. 60 is a skeleton diagram showing another example of the gear train.
FIG. 61 is a clutch and brake application chart for the major speeds of the automatic transmission equipped with the gear train shown in FIG. 60.

In the embodiment shown in FIG. 60, more specifically: the fourth clutch means K4 of FIG. 36 is composed of the one-way clutch 20 and the multiple disc clutch 22 which are arranged in parallel with each other; the first brake means B1 is composed of the one-way clutch 40, which is interposed between the sun gears 3S of the third planetary gear set 3 and the casing 6, and the band brake 42 arranged in parallel with the one-way clutch 40; the third and fourth brake means B3 and B4 are made of band brakes; and the remaining frictional engagement means are made to have the multiple disc structures.

The chart according to the method of the present invention for the automatic transmission shown in FIG. 60 is tabulated in FIG. 61.

In case the method of the present invention for the automtic transmission having the structure shown in FIG. 60 is executed according to the chart shown in FIG. 61, the unncessary rotations of the rotary members can be suppressed, like the aforementioned case for the automatic transmission shown in FIG. 1, to reduce the rotational fluctuations accompanying the speed change and to execute the speed changes of the five forward major speeds by using the two engagement means as the elements to be disengaged.

Figures 62, 63:
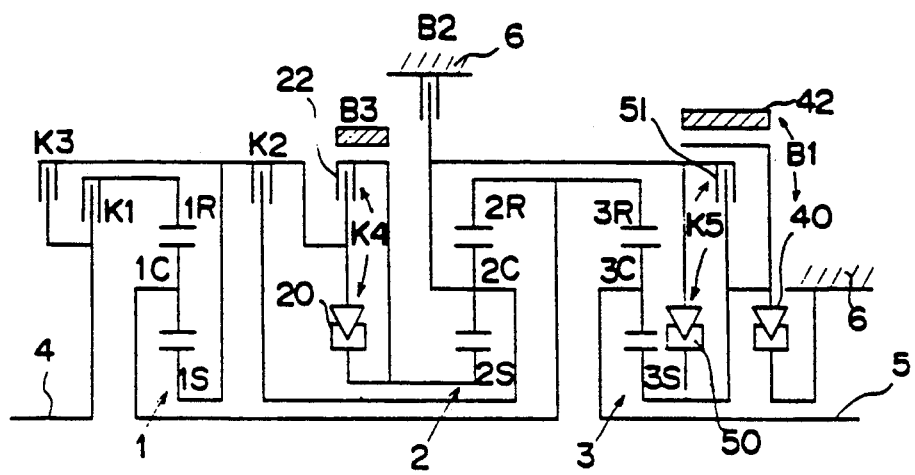
FIG. 62 is a skeleton diagram showing another example of the gear train.
FIG. 63 is a clutch and brake application chart for the major speeds of the automatic transmission equipped with the gear train shown in FIG. 62.

In the embodiment shown in FIG. 62, the fourth brake means B4 is eliminated to the aforementioned structure shown in FIG. 60, and the fifth clutch means K5 is composed of the one-way clutch 50 and the multiple disc clutch 51 which are arranged in parallel with each other. The remaining structure is left similar to that shown in FIG. 60. The chart for setting those five major forward speed is tabulated in FIG. 63.

Figures 64, 65:
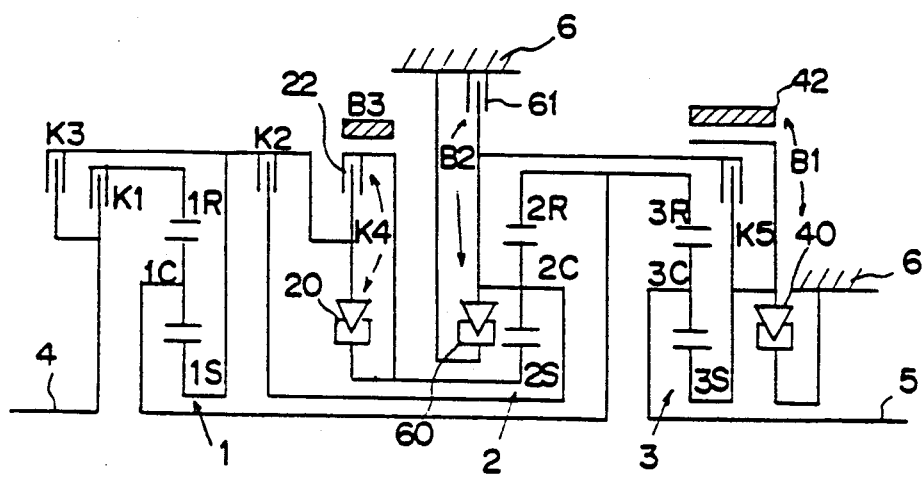
FIG. 64 is a skeleton diagram showing another example of the gear train.
FIG. 65 is a clutch and brake application chart for the major speeds of the automatic transmission equipped with the gear train shown in FIG. 64.

In an embodiment shown in FIG. 64, the fourth brake means B4 is eliminated to the aforementioned structure shown in FIG. 60, and the second brake means B2 is composed of the one-way clutch 60, which is interposed between the carrier 2C of the second planetary gear set 2 and the casing 6, and the multiple disc brake 61 arranged in parallel with the one-way clutch 60. The remaining structure is left similar to that shown in FIG. 60. The chart for setting the major forward five speeds is tabulated in FIG. 65.

Incidentally, the structure of the automatic transmission according to the present invention should not be limited to those of the embodiments thus far described, but the frictional engagement means such as the clutch means and the brake means could be exemplified by the combinations of the band brakes and the multiple disc clutches, as has been disclosed by us in Japanese Patent Applications Nos. 63-176270 and 63-221670, for example. Moreover, the changes in the engagement-disengagement patterns at a common gear ratio in the present invention could be executed either in response to or prior to the output of a speed change instruction. In the present invention, still moreover, the combination patterns for engagements and disengagements of the frictional engagement means to be selected for setting individual speeds should not be limited to the aforementioned ones of the foregoing embodiments but could be varied in accordance with the structures of the individual automatic transmissions.

What is claimed is:

1. An automatic transmission comprising:
    a plurality of frictional engagement means;
    a gear train including a plurality of rotary members settable to a plurality of speed stages of different gear ratios in accordance with the engagement-/disengagement states of said frictional engagement means, wherein said gear train has plural combination patterns of the engagement/disengagement of said frictional engagement means for setting at least one of the speed stages, and wherein for said at least one of said speed stages the number of revolutions of at least one rotary member of said plurality of rotary members differs between said plural engagement/disengagement patterns setting said at least one speed stage;
    means for determining the number of revolutions of at least said one rotary member in at least said one of said speed stages and in another speed stage; and
    speed change control means responsive to said determining means for selecting one of said plural combination patterns of the engagement/disengagement of said frictional engagement means for setting said one speed stage at the time of a speed change to or from said one speed stage from or to said another speed stage.

2. An automatic transmission according to claim 1, wherein said speed change control means comprises means to select such a combination pattern of the engagement/disengagement of said frictional engagement means that a fluctuating number of revolutions of said at least one rotary member accompanying a speed change is no more than a predetermined value.

3. An automatic transmission according to claim 2, wherein said speed change control means comprises means to select such a combination pattern of the engagement/disengagement of said frictional engagement means that the number of said frictional engagement means having their engagement/disengagement states changed for executing a speed change is minimized.

4. An automatic transmission according to claim 1, wherein said speed change control means comprise means for selecting, as a combination pattern of said engagement/disengagement of said frictional engagement means for setting said at least one speed stage to be to or from a present speed stage, such a combination pattern of said engagement/disengagement of said frictional engagement means that the sum of the fluctuating numbers of revolutions of said at least one rotary member for a time period from a present speed stage to said at least one speed stage and the fluctuating number of revolutions of said at least one rotary member for a time period from said at least one speed stage to said another speed stage is decreased.

5. An automatic transmission according to claim 4, wherein said speed change control means comprises means to determine said at least one speed stage on the basis of a vehicle speed and a load.

6. An automatic transmission according to claim 4, wherein said speed change control means comprises means to select a speed stage adjacent to said at least one speed stage as said another speed stage.

7. An automatic transmission according to claim 1, wherein said speed change control means comprises means to select, as the combination pattern of the engagement/disengagement of said frictional engagement means for setting said at least one speed stage, such a pattern that the number of the frictional engagement means to have their engagement/disengagement states changed at the time of a speed change from said another speed stage is no more than a change states reference value of; and means to change the combination pattern of the engagement/disengagement of said frictional engagement means for setting said at least one speed stage, in case the number of revolutions of said at least one rotary member at said selected pattern exceeds a predetermined reference value of the number of revolutions, from said selected pattern into such another pattern that the number of revolutions of said at least one rotary member is no more than said reference value of the number of revolutions.

8. An automatic transmission according to claim 7, wherein said speed change control means comprises means for executing the change from said selected pattern to said another pattern after completion of the setting of said at least one speed stage by said selected pattern.

9. An automatic transmission according to claim 8, wherein said speed change control means comprises means to detect the end of the setting of said at least one speed stage on the basis of the number of revolutions of a rotary member in said gear train.

10. An automatic transmission according to claim 8, wherein said speed change control means comprises means to detect the end of the setting of said at least one speed stage on the basis of the number of output revolutions.

11. An automatic transmission according to claim 7, wherein said speed change control means comprises means to execute the change from said selected pattern to said another pattern after a predetermined time period has elapsed from the time at which a signal instructing the setting of said at least one speed stage according to said selected pattern was outputted.

12. An automatic transmission according to claim 7, wherein said speed change control means comprises means to determine the number of revolutions of said at least one rotary member on the basis of the number of input revolutions.

13. An automatic transmission according to claim 1, wherein said speed change control means comprises means to change the combination pattern of the engagement/disengagement of said frictional engagement means for setting said at least one speed, at the time of a speed change from said at least one speed stage to another speed stage, into such another pattern that the fluctuating number of revolutions of said at least one rotary member in said speed stage is decreased.

14. An automatic transmission according to claim 1, wherein said speed change control means comprises means, when the number of input revolutions is high, to change the combination pattern of the engagement/disengagement of said frictional engagement means for setting said at least one speed, at the time of a speed change between said at least one speed stage and another speed stage, into such another pattern that the fluctuating number of revolutions of said at least one rotary member in said at least one speed stage is decreased.

15. An automatic transmission according to claim 1, wherein said speed change control means comprises means to select, as the combination pattern of the engagement/disengagement of said frictional engagement means for setting said at least one speed stage, a pattern for a large fluctuating number of revolutions of said at least one rotary member if the number of revolutions of another rotary member is no more than a predetermined value at the time of a speed change to said at least one speed stage; and to select a pattern for small fluctuating number of revolutions of said at least one rotary member if the number of revolutions of another rotary member exceeds the predetermined value.

16. An automatic transmission according to claim 15, wherein said another rotary members is an input rotary member ot input torque to said gear train.

17. An automatic transmission according to claim 15, wherein said speed change control means comprises means to select, as the combination pattern of the engagement/disengagement of said frictional engagement means to be selected when the number of revolutions of said another rotary member is no more than the predetermined value, such a pattern that the number of said frictional engagement means for switching the engagement/disengagement states at the time of the speed change to said at least one speed stage is minimized.

18. An automatic transmission according to claim 1, wherein said gear train comprises:
an input shaft;
an output shaft;

a first planetary gear set comprising a first sun gear, a first ring gear, a first pinion gear meshing with both said first sun gear and said first ring gear, and a first carrier supporting said first pinion gear;

a second planetary gear set comprising a second sun gear capable of being connected integrally or selectively to said first sun gear, a second ring gear, a second pinion gear meshing with both said second sun gear and said second ring gear, and a second carrier supporting said second pinion gear; and a third planetary gear set comprising a third sun gear capable of being connected integrally or selectively to said second carrier, a third ring gear capable of being connected integrally or selectively to said first carrier, a third pinion gear meshing with both said third sun gear and said third ring gear, and a third carrier supporting said third pinion gear and capable of being connected integrally or selectively to, said second ring gear.

19. An automatic transmission according to claim 18, further comprising:
a first clutch unit for selectively connecting said input shaft and said first ring gear;
a second clutch unit for selectively connecting said first sun gear and said second carrier;
a third clutch unit for selectively connecting said input shaft and said first sun gear;
a fourth clutch unit for selectively connecting said first sun gear and said second sun gear;
a first brake unit for selectively holding said second carrier; and
a second brake unit for selectively holding said second sun gear,
wherein said output shaft is connected to said second ring gear or said third carrier.

20. An automatic transmission according to claim 19, wherein said fourth clutch unit comprises a multiple disc clutch and a one-way clutch disposed in parallel with said multiple disc clutch.

21. An automatic transmission according to claim 20, wherein said second brake unit is a band brake.

22. An automatic transmission according to claim 19, wherein said first brake unit comprises a multiple disc brake and a one-way clutch disposed in parallel with said multiple disc brake.

23. An automatic transmission according to claim 1, wherein said gear train comprises:
an input shaft;
an output shaft;
a first planetary gear set comprising a first sun gear, a first ring gear, a first pinion gear meshing with both said first sun gear and said first ring gear, and a first carrier supporting said first pinion gear;
a second planetary gear set comprising a second sun gear connected integrally or selectively to said first sun gear, a second ring gear connected integrally or selectively to said first carrier, a second pinion gear meshing with both said second sun gear and said second ring gear, and a second carrier supporting said second pinion gear; and
a third planetary gear set comprising a third sun gear connected integrally or selectively to said second carrier, a third ring gear connected integrally or selectively to said second ring gear, a third pinion gear meshing with both said third sun gear and said third ring gear, and a third carrier supporting said third pinion gear.

24. An automatic transmission according to claim 23, further comprising:
a first clutch unit for selectively connecting said input shaft and said first ring gear;
a third clutch unit for selectively connecting said input shaft and said first sun gear;
a fifth clutch unit for selectively connecting said second carrier and said third sun gear;
a second brake unit for selectively holding said second sun gear; and
a third brake unit for selectively holding said third sun gear,
wherein said output shaft is connected to said third carrier.

25. An automatic transmission according to claim 24, further comprising: a first brake unit for selectively holding said second carrier.

26. An automatic transmission according to claim 25, further comprising:
a second clutch unit for selectively connecting said first sun gear and said second carrier; and
a fourth clutch unit for selectively connecting said first sun gear and said second sun gear.

27. An automatic transmission according to claim 26, further comprising: a fourth brake unit for selectively holding said first sun gear.

28. A speed change control method for an automatic transmission which comprises a plurality of frictional engagement means and a gear train including a plurality of rotary members settable to a plurality of speed stages of different gear ratios in accordance with the engagement/disengagement states of said frictional engagement means, wherein said gear train has plural combination patterns of the engagement/disengagement of said frictional engagement means for setting at least one of said speed stages, and wherein for said at least one of said speed stages the number of revolutions of at least one rotary member of said plurality of rotary members differs between said plural engagement/disengagement patterns setting said at least one speed stage, said method comprising the steps of:
determining the number of revolutions of at least said one rotary member in at least said one of said speed stages and in another speed stage; and
selecting a combination pattern of the engagement/disengagement states of said frictional engagement means in response to said determination at the time of a speed change to or from said at least one speed stage from or to said another speed stage.

29. A speed change control method for an automatic transmission according to claim 28, wherein said selecting step comprises selecting such a combination pattern of the engagement/disengagement of said frictional engagement means that a fluctuating number of revolutions of said at least one rotary member accompanying a speed change is no more than a predetermined value.

30. A speed change control method for an automatic transmission according to claim 28, wherein said selecting step comprises selecting a combination pattern of the engagement/disengagement of said frictional engagement means so that the number of said frictional engagement means having their engagement/disengagement states changed for executing a speed change is minimized.

31. A speed change control method for an automatic transmission according to claim 28, wherein said selecting step comprises selecting such a combination pattern of said engagement/disengagement of said frictional engagement means that the sum of the fluctuating number of revolutions of said at least one rotary member for a time period from a present speed stage to said at least one speed stage and the fluctuating number of revolutions of said at least one rotary member for a time period from said at least one speed stage to said another speed stage is decreased.

32. A speed change control method for an automatic transmission according to claim 31, wherein said predetermined speed stage is determined on the basis of a vehicle speed and a load.

33. A speed change control method for an automatic transmission according to claim 31, wherein said selecting step comprises selecting as said another speed stage a speed stage which is adjacent to said at least one speed stage.

34. A speed change control method for an automatic transmission according to claim 28, wherein said selecting step comprises selecting as said another speed stage such a pattern that the number of the frictional engagement means to have their engagement/disengagement states changed at the time of a speed change from said another speed stage is no more than a changed states reference value, and wherein the combination pattern of the engagement/disengagement of said frictional engagement means for setting said at least one speed stage is changed, in case the number of revolutions of said at least one rotary member at said selected pattern exceeds a number of revolutions predetermined reference value, from said selected pattern into such another pattern that the number of revolutions of said at least one rotary member may be no more than said number of revolutions reference value.

35. A speed change control method for an automatic transmission according to claim 34, wherein the change from said selected pattern to said another pattern is executed after completion of the setting of said at least one speed stage by said selected pattern.

36. A speed change control method for an automatic transmission according to claim 35, including the step of detecting the end of the setting of said at least one speed stage on the basis of the number of revolutions of a rotary member in said gear train.

37. A speed change control method for an automatic transmission according to claim 35, including the step of detecting the end of the setting of said at least one speed stage on the basis of the number of revolutions of an output shaft.

38. A speed change control method for an automatic transmission according to claim 34, wherein the change from said selected pattern to said another pattern is executed after a predetermined time period has elapsed from the time at which a signal instructing the setting of said at least one speed stage according to said selected pattern was outputted.

39. A speed change control method for an automatic transmission according to claim 34, wherein said determining step comprises determining the number of revolutions of an input shaft.

40. A speed change control method for an automatic transmission according to claim 28, including the step of changing the combination pattern of the engagement/disengagment of said frictional engagement means for setting said at least one speed stage, at the time of a speed change from said at least one speed stage to another speed stage, into such another pattern that the fluctuating number of revolutions of said at least one rotary member in said at least one speed stage is decreased.

41. A speed change control method for an automatic transmission according to claim 28, including the step of changing, when the number of revolutions of an imput shaft is high, the combination pattern of the engagement/disengagement of said frictional engagement means for setting said at least one speed stage at the time of a speed change from said at least one speed stage to another speed stage, into such another pattern that the fluctuating number of revolutions of said at least one rotary member in said at least one speed stage is decreased.

42. A speed change control method for an automatic transmission according to claim 28, wherein said selecting step comprises selecting a pattern for a large fluctuating number of revolutions of said at least one rotary member when the number of revolutions of another rotary member is not more than a predetermined value at the time of a speed change to said at least one speed stage, and wherein a pattern for small fluctuating number of revolutions of said at least one rotary member is selected if the number of revolutions of another rotary member exceeds the predetermined value.

43. A speed change control method for an automatic transmission according to claim 42, wherein said another rotary member is an input rotary member to input torque to said gear train.

44. A speed change control method for an automatic transmission according to claim 42, wherein said selecting step comprises selecting such a pattern that the number of said frictional engagement means for switching the engagement/disengagement states at the time of the speed change to said at least one speed stage is minimized when the number of revolutions of said another rotary member is no more than the predetermined value.

45. An automatic transmission comprising:
a plurality of frictional engagement means;
a gear train including a plurality of rotary members settable to a plurality of speed stages of different gear ratios in accordance with the engagement/disengagement states of said frictional engagement means, wherein said gear train has plural combination patterns of the engagement/disengagement of said frictional engagement means for setting at least one of the speed stages, and wherein for said at least one of the speed stages, and wherein for said at least one of said speed stages the number of revolutions of at least one rotary member of said plurality of rotary members does not differ between said plural engagement/disengagement patterns setting said at least on speed stage;
means for determining the number of revolutions of at least said one rotary member in at least said one of said speed stages and in another speed stage; and
speed change control means responsive to said determining means for selecting one of said combination patterns of the engagement/disengagement of said frictional engagement means for setting said one speed at the time of a speed change to or from said one speed stage from or to said another speed stage.

46. An automatic transmission according to claim 45, wherein said speed change control means comprises means to change the selected combination pattern of the engagement/disengagement of said frictional engagement means for setting said at least one speed stage to another combination pattern of the engagement/disengagement of said frictional engagement means having the same number of revolutions of said at least one rotary member, prior to the execution of a speed change.

47. A speed change control method for an automatic transmission which comprises a plurality of frictional engagement means and a gear train including a plurality of rotary members settable to a plurality of speed stages of different gear ratios in accordance with the engagement/disengagement states of said frictional engagement means, wherein said gear train has plural combination patterns of the engagement/disengagement of said frictional engagement means for setting at least one of said speed stages, and wherein for said at least one of said speed stages the number of rovolutions of at least one rotary member of said plurality of rotary members does not differ between said plural engagement/disengagement patterns setting said at least one speed stage, said method comprising the steps of:

determining the number of revolutions of at least said one rotary member in at least said one of said speed stages and in another speed stage; and selecting a combination pattern of the engagement/disengagement states of said frictional engagement means in response to said determination at the time of a speed change to or from said at least one speed stage from or to said another speed stage.

48. A speed change control method for an automatic transmission according to claim 47, including the step of changing the combination pattern of the engagement/disengagement of said frictional engagement means for setting said at least one speed stage into such another combination pattern of the engagement/disengagement of said frictional engagement means wherein the number of revolutions of said at least one rotary member is unchanged, prior to the execution of a speed change.

* * * * *